(12) United States Patent
Anabuki et al.

(10) Patent No.: US 12,195,039 B2
(45) Date of Patent: Jan. 14, 2025

(54) INFORMATION PROCESSING METHOD, INFORMATION PROCESSING SYSTEM, AND INFORMATION PROCESSING DEVICE

(71) Applicant: Panasonic Intellectual Property Management Co., Ltd., Osaka (JP)

(72) Inventors: Motoshi Anabuki, Hyogo (JP); Yoshimasa Honda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/517,234

(22) Filed: Nov. 22, 2023

(65) Prior Publication Data

US 2024/0092383 A1 Mar. 21, 2024

Related U.S. Application Data

(63) Continuation of application No. 17/510,957, filed on Oct. 26, 2021, now Pat. No. 11,866,065, which is a
(Continued)

(30) Foreign Application Priority Data

Feb. 14, 2020 (JP) ................................. 2020-023199

(51) Int. Cl.
*B60W 60/00* (2020.01)
*B60W 50/00* (2006.01)
(Continued)

(52) U.S. Cl.
CPC .......... *B60W 60/001* (2020.02); *B60W 50/00* (2013.01); *G06V 20/56* (2022.01); *H04L 67/125* (2013.01); *B60W 2050/0028* (2013.01)

(58) Field of Classification Search
CPC ............... B60W 60/001; B60W 50/00; B60W 2050/0028; B60W 50/06; B60W 2556/45;
(Continued)

(56) References Cited

U.S. PATENT DOCUMENTS 10,331,128 B1 6/2019 Hansel
10,919,163 B1 2/2021 Li
(Continued)

FOREIGN PATENT DOCUMENTS

JP 2003-15741 1/2003
JP 3881197 2/2007
(Continued)

OTHER PUBLICATIONS

International Search Report (ISR) issued on Jan. 26, 2021 in International (PCT) Application No. PCT/JP2020/048205.
(Continued)

*Primary Examiner* — Ashley L Redhead, Jr.
(74) *Attorney, Agent, or Firm* — Wenderoth, Lind & Ponack, L.L.P.

(57) ABSTRACT

An information processing method is to be executed by a computer. The information processing method includes: receiving, from an autonomous moving body, a first processing result that is a result of first preprocessing of travel control processing in autonomous movement processing of the autonomous moving body, and sensing data received by the autonomous moving body; executing second preprocessing based on the sensing data to receive a second processing result, the second preprocessing being more advanced than the first preprocessing; determining a difference between the first processing result and the second processing result; and outputting, to the autonomous moving body based on the difference determined, a change request to change the first processing result to the third processing result, the third
(Continued)

processing result being received based on at least one of the first processing result or the second processing result.

18 Claims, 10 Drawing Sheets

Related U.S. Application Data continuation of application No. PCT/JP2020/048205, filed on Dec. 23, 2020.

(51) Int. Cl.
    *G06V 20/56*     (2022.01)
    *H04L 67/125*     (2022.01)

(58) Field of Classification Search
    CPC ....... G06V 20/56; H04L 67/125; H04L 67/12; G05D 1/0282; G08G 1/09; G08G 1/16; G08G 1/096725; G08G 1/01; G08G 1/096775; H04W 4/44
    See application file for complete search history.

(56) References Cited

U.S. PATENT DOCUMENTS

| | | | |
|---|---|---|---|
| 11,209,887 | B1 | 12/2021 | Jung |
| 2011/0125344 | A1* | 5/2011 | An ................. G08G 1/09685 701/25 |
| 2013/0211988 | A1 | 8/2013 | Dorn |
| 2018/0209802 | A1 | 7/2018 | Jung |
| 2018/0314250 | A1 | 11/2018 | Lewis |
| 2019/0271991 | A1* | 9/2019 | Dulmage ................. G08G 1/22 |
| 2019/0359202 | A1* | 11/2019 | Zhu ....................... G05D 1/0246 |
| 2019/0359221 | A1 | 11/2019 | Ochida et al. |
| 2020/0204440 | A1 | 6/2020 | Viswanathan |
| 2020/0204614 | A1 | 6/2020 | Schmitz |
| 2020/0229206 | A1 | 7/2020 | Badic |
| 2020/0349835 | A1 | 11/2020 | Trim |
| 2022/0108248 | A1 | 4/2022 | Oobayashi |
| 2022/0315045 | A1 | 10/2022 | Urano |
| 2022/0318162 | A1 | 10/2022 | Hornung |
| 2022/0332302 | A1 | 10/2022 | Watanabe |
| 2022/0348232 | A1 | 11/2022 | Vogt |

FOREIGN PATENT DOCUMENTS

| | | |
|---|---|---|
| JP | 2017-81425 | 5/2017 |
| JP | 2018-167648 A | 11/2018 |
| JP | 2019-16118 | 1/2019 |
| WO | 2017/057053 | 4/2017 |
| WO | 2018/154860 | 8/2018 |

OTHER PUBLICATIONS

Extended European Search Report dated Jun. 19, 2023 in counterpart European Patent Application No. 20918381.3, 10 pages.

Oba Yoshihiro, Oct. 28, 2015, English Machine Translation_ JP2017081425A provided by Patent Translate by EPO and Google (Year: 2015).

Kaino Akihiko, Sep. 30, 2015, English Machine Translation_ WO2017057053A1 provided by Patent Translate by EPO and Google (Year: 2015).

* cited by examiner

US 12,195,039 B2

INFORMATION PROCESSING METHOD, INFORMATION PROCESSING SYSTEM, AND INFORMATION PROCESSING DEVICE

CROSS REFERENCE TO RELATED APPLICATIONS

This application is a continuation of U.S. application Ser. No. 17/510,957, filed Oct. 26, 2021, which is a continuation application of PCT International Application No. PCT/JP2020/048205 filed on Dec. 23, 2020, designating the United States of America, which is based on and claims priority of Japanese Patent Application No. 2020-023199 filed on Feb. 14, 2020. The entire disclosures of the above-identified applications, including the specifications, drawings and claims are incorporated herein by reference in their entirety.

FIELD

The present disclosure relates to an information processing method, an information processing system, and an information processing device related to autonomous movement of an autonomous moving body.

BACKGROUND

Multiplexing of hardware or software is demanded to improve the safety of an autonomous driving system for an autonomous driving vehicle. For example, Patent Literatures (PTLs) 1 and 2 suggest improving the safety by combining a power source and systems with detection and control functions in an autonomous driving vehicle.

CITATION LIST

Patent Literature

PTL 1: International Patent Publication No. 2018/154860
PTL 2: Japanese Patent No. 3881197

SUMMARY

Technical Problem

However, in view of the costs, the power consumption, the space, and other aspects, limited computers are mountable on an autonomous moving body such as an autonomous driving vehicle. Autonomous movement systems mounted on the autonomous moving body may exhibit lower performance. The techniques disclosed in PTL 1 and 2 improve the safety in the autonomous movement by multiplexing the hardware or software mounted on the autonomous moving body, but exhibit insufficient performance in the autonomous movement.

To address the problem, the present disclosure provides an information processing method, for example, capable of improving the performance in autonomous movement.

Solution to Problem

An information processing method according to the present disclosure is to be executed by a computer. The information processing method includes: receiving, from an autonomous moving body, a first processing result that is a result of first preprocessing and sensing data received by the autonomous moving body, the first preprocessing being preprocessing of travel control processing in autonomous movement processing of the autonomous moving body; executing second preprocessing based on the sensing data to receive a second processing result, the second preprocessing being more advanced than the first preprocessing; determining a difference between the first processing result and the second processing result; and outputting, to the autonomous moving body in accordance with the difference determined, a change request to change the first processing result to a third processing result, the third processing result being received based on at least one of the first processing result or the second processing result.

The general and specific aspect may be implemented using a system, a method, an integrated circuit, a computer program, or a computer-readable recording medium such as a CD-ROM, or any combination of systems, methods, integrated circuits, computer programs, or recording media.

Advantageous Effects

The information processing method, for example, according to an aspect of the present disclosure improves the performance in autonomous movement.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
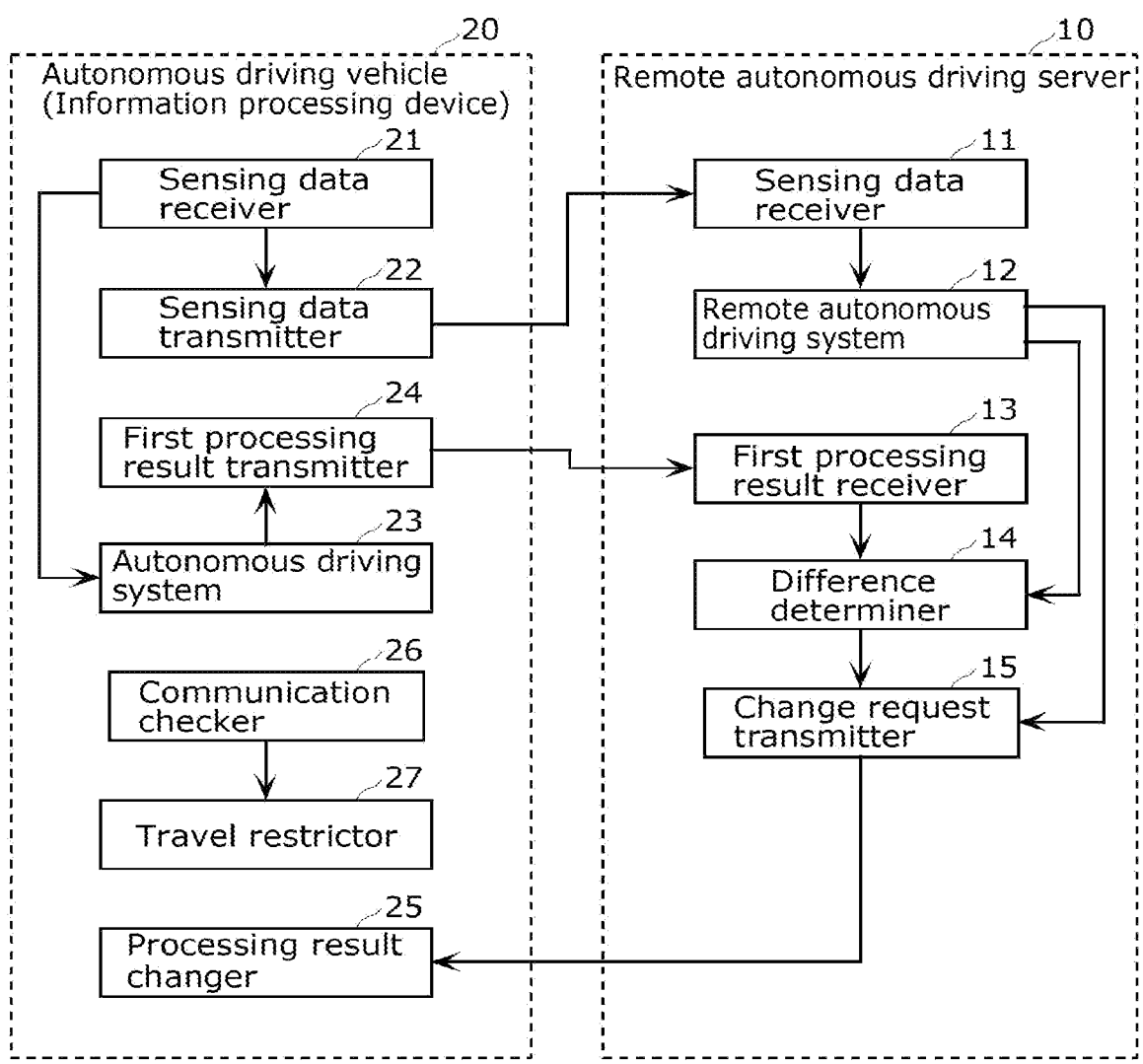
FIG. 1 is a block diagram showing an example of an autonomous driving vehicle and a remote autonomous driving server according to Embodiment 1.

An information processing method according to an aspect of the present disclosure is to be executed by a computer. The information processing method includes: receiving, from an autonomous moving body, a first processing result that is a result of first preprocessing and sensing data received by the autonomous moving body, the first preprocessing being preprocessing of travel control processing in autonomous movement processing of the autonomous moving body; executing second preprocessing based on the sensing data to receive a second processing result, the second preprocessing being more advanced than the first preprocessing; determining a difference between the first processing result and the second processing result; and outputting, to the autonomous moving body in accordance with the difference determined, a change request to change the first processing result to a third processing result, the third processing result being received based on at least one of the first processing result or the second processing result.

In view of the costs, the power consumption, the space, and other aspects, limited computers are mountable on an autonomous moving body such as an autonomous driving vehicle. In the autonomous moving body, in addition to the executed first preprocessing, the second preprocessing that is more advanced than the first preprocessing is executed by a server, for example, in which the costs, the power consumption, the space, and other aspects are less limited. Then, the difference between the first processing result that is the result of the first preprocessing and the second processing result that is the result of the second preprocessing is determined. In accordance with the difference, the change request to change the first processing result to the third processing result is output to the autonomous moving body. The first processing result is the result of the first preprocessing that is the preprocessing of the travel control processing of the autonomous moving body. The third processing result is based on the second processing result that is the result of the advanced second preprocessing. Alternatively, in accordance with the difference, the change request to change the first processing result to the third processing result that is received by correcting or limiting, for example, the first processing result is output to the autonomous moving body. The third processing result that is more advanced than the first processing result is thus used for the travel control processing of the autonomous moving body. Accordingly, the performance in autonomous movement improves.

The first preprocessing may be executed using a first resource. The second preprocessing may be executed using a second resource. The first resource and the second resource may be different from each other.

In this manner, the second preprocessing that is more advanced than the first preprocessing may be executed using the second resource different from the first resource used for the execution of the first preprocessing. Accordingly, the second preprocessing is processable at a higher accuracy, at a higher speed, and with less delay than the first preprocessing.

The first preprocessing may be executed using a first algorithm. The second preprocessing may be executed using a second algorithm. The first algorithm and the second algorithm may be different from each other.

In this manner, the second preprocessing that is more advanced than the first preprocessing may be executed using the second algorithm different from the first algorithm used for the execution of the first preprocessing. Accordingly, the second preprocessing is processable at a higher accuracy, at a higher speed, and with less delay than the first preprocessing.

Each of the first preprocessing and the second preprocessing may include recognition processing of recognizing environment of the autonomous moving body.

In this manner, each preprocessing may include the recognition processing whose result may be used for the travel control processing of the autonomous moving body. Accordingly, the safety and comfortability of the autonomous moving body improve.

Each of the first preprocessing and the second preprocessing may include travel determination processing of determining travel of the autonomous moving body.

In this manner, each preprocessing may include the travel determination processing, of the autonomous moving body, whose result may be used for the travel control processing of the autonomous moving body. Accordingly, the safety and comfortability of the autonomous moving body improve.

The third processing result may be the second processing result.

With this configuration, the second processing result that is a result of the second preprocessing, which is more advanced than the first preprocessing, is used for the travel control processing of the autonomous moving body. Accordingly, the performance in the autonomous movement improves.

The third processing result may be received by correcting the first processing result based on the difference.

With this configuration, the third processing result is used for the travel control of the autonomous moving body. The third processing result is received by correcting the first processing result based on the difference between the first and second processing results. The second processing result is the result of the second preprocessing that is more advanced than the first preprocessing. Accordingly, the performance in the autonomous movement improves.

The method may further include: executing the second preprocessing to receive the second processing result, when a request to execute the second preprocessing is received from the autonomous moving body; and outputting, to the autonomous moving body, the change request as a response to the request.

This configuration allows the execution of the second preprocessing, for example, when the autonomous moving body requests the execution of the advanced second preprocessing.

The request may include information designating specific processing out of the second preprocessing. The specific processing may be executed to receive the second processing result.

This configuration allows the selective execution of the specific processing designated out of the second preprocessing, for example, as desired by the autonomous moving body.

The method may further include: determining whether the second preprocessing is to be executed, when the request is received; and rejecting or ignoring the request, if it is determined not to execute the second preprocessing. For example, whether the second preprocessing is to be executed is determined based on at least one of a resource of the autonomous moving body, a moving condition of the autonomous moving body, environment outside the autonomous moving body, a time, or a response time to the request.

When a request is received, the performance in the autonomous movement may not be improved even by executing the second preprocessing depending on conditions. For example, depending on the following conditions, the performance in the autonomous movement may not be improved by executing the second preprocessing and controlling the travel of the autonomous moving body using the third processing result. The conditions include the resource of the autonomous moving body, the moving condition of the autonomous moving body, the environment outside the autonomous moving body, the time, and the response time to a request. In such cases, the request can be rejected or ignored.

An information processing system according to an aspect of the present disclosure is communicative with an autonomous moving body. The information processing system receives, from an autonomous moving body, a first processing result that is a result of first preprocessing and sensing data received by the autonomous moving body, the first preprocessing being preprocessing of travel control processing in autonomous movement of the autonomous moving body; executes second preprocessing based on the sensing data to receive a second processing result, the second preprocessing being more advanced than the first preprocessing; determines a difference between the first processing result and the second processing result; and outputs, to the autonomous moving body in accordance with the difference determined, a change request to change the first processing result to a third processing result, the third processing result being received based on at least one of the first processing result or the second processing result.

Accordingly, the information processing system is provided which exhibits higher performance in the autonomous movement.

An information processing device according to an aspect of the present disclosure is mounted on an autonomous moving body. The information processing device executes first preprocessing that is preprocessing of travel control processing in autonomous driving of the autonomous moving body to receive a first processing result; outputs sensing data received by the autonomous moving body to an external device; receives, from the external device, a second processing result that is received by executing second preprocessing based on the sensing data, the second preprocessing being more advanced than the first preprocessing; determines a difference between the first processing result and the second processing result; and changes the first processing result to a third processing result in accordance with the difference determined, the third processing result being received based on at least one of the first processing result or the second processing result.

For example, in view of the costs, the power consumption, the space, and other aspects, limited computers are mountable on an autonomous moving body such as an autonomous driving vehicle. In the autonomous moving body, in addition to the executed first preprocessing, the second preprocessing that is more advanced than the first preprocessing is executed by an external device such as a server in which the costs, the power consumption, the space, and other aspects are less limited. The second processing result that is a result of the second preprocessing is transmitted to the autonomous driving vehicle. The difference between the first processing result that is a result of the first preprocessing and the second processing result that is the result of the second preprocessing is determined by the autonomous driving vehicle. In accordance with the difference, the first processing result is changed to the third processing result. The first processing result is the result of the first preprocessing that is the preprocessing of the travel control processing of the autonomous moving body. The third processing result is based on the second processing result that is the result of the advanced second preprocessing. Alternatively, in accordance with the difference, the first processing result is changed to the third processing result that is received by correcting or limiting, for example, the first processing result. The third processing result that is more advanced than the first processing result is thus used for the travel control processing of the autonomous moving body. Accordingly, the performance in the autonomous movement improves.

The information processing device may further output a request to execute the second preprocessing to the external device; and receive the second processing result as a response to the request.

This configuration allows the external device to execute the second preprocessing, for example, when the autonomous moving body requests the execution of the advanced second preprocessing.

The information processing device may further output the request to the external device based on at least one of a resource of the autonomous moving body, a moving condition of the autonomous moving body, environment outside the autonomous moving body, a time, or a response time to an inquiry to the external device.

Depending on conditions, the performance in the autonomous movement may not be improved even by executing the second preprocessing. For example, depending on the following conditions, the performance in the autonomous movement may not be improved by executing the second preprocessing and controlling the travel of the autonomous moving body using the third processing result. The conditions include the resource of the autonomous moving body, the moving condition of the autonomous moving body, the environment outside the autonomous moving body, the time, and the response time to a request. In such cases, no request is output. In other words, depending on conditions, the performance in the autonomous movement may be improved by executing the second preprocessing. In this manner, if the performance in the autonomous movement can be improved, a request is output.

The request may include information designating specific processing out of the second preprocessing. The second processing result may be received by executing the specific processing.

This configuration designates the specific processing out of the second preprocessing, for example, as desired by the autonomous moving body and allows the external device to selectively execute the specific processing.

If the second processing result is received after a lapse of a predetermined time or more after the sensing data or the request has been output, (A) the determining of the difference may be not executed, or (B) a difference between a part of the first processing result and a part of the second processing result which corresponds to the part of the first processing result may be determined, and the part of the first processing result may be changed to the third processing result in accordance with the difference determined.

Accordingly, if the second processing result is received after a lapse of the predetermined time or more after the sensing data or the request has been output, there may be a delay in the communications with the external device. At this time, the processing load of the information processing device is reduced by executing no difference determination or the determination only on the difference in a part of the processing result that is not susceptible by the delay.

Now, embodiments will be described in detail with reference to the drawings.

Note that the embodiments described below are mere comprehensive or specific examples. The numerical values, shapes, materials, constituent elements, the arrangement and connection of the constituent elements, steps, step orders, etc. shown in the following embodiments are thus mere examples, and are not intended to limit the scope of the present disclosure.

Embodiment 1

Embodiment 1 will be described with reference to FIGS. 1 to 3.

FIG. 1 is a block diagram showing an example of an autonomous driving vehicle (specifically, information processing device 20 mounted on the autonomous driving vehicle) and remote autonomous driving server 10 according to Embodiment 1.

The autonomous driving vehicle travels autonomously without any driving operation by a person, for example. The autonomous driving vehicle includes sensors such as a camera, a thermographic camera, a radar, a light detection and ranging (LiDAR) sensor, a Sonar sensor, a global positioning system (GPS), or an inertial measurement unit (IMU). With these, the autonomous driving vehicle recognizes the surrounding environment and travels autonomously. Note that the autonomous driving vehicle is an example of an autonomous moving body. The autonomous moving body may be a moving robot, a flying object such as a drone, or a ship.

Remote autonomous driving server 10 performs wireless communications with the autonomous driving vehicle and remotely controls the autonomous driving of the autonomous driving vehicle. Note that the autonomous driving is an example of the autonomous movement.

The autonomous driving vehicle includes information processing device 20 mounted thereon. Information processing device 20 is a computer including a processor, a memory, a communication interface, and other components. The memory is a read-only memory (ROM) or a random-access memory (RAM), for example, capable of storing the programs to be executed by the processor. Information processing device 20 includes sensing data receiver 21, sensing data transmitter 22, autonomous driving system 23, first processing result transmitter 24, processing result changer 25, communication checker 26, and travel restrictor 27. Each of sensing data receiver 21, sensing data transmitter 22, autonomous driving system 23, first processing result transmitter 24, processing result changer 25, communication checker 26, and travel restrictor 27 may be a processor, for example, that executes the programs stored in the memory.

Sensing data receiver 21 receives the sensing data from the sensors such as the camera, the thermographic camera, the radar, LiDAR, the Sonar sensor, the GPS, or the IMU included in the autonomous driving vehicle. Note that sensing data receiver 21 may receive the sensing data from the sensors on other vehicles or traffic lights.

Sensing data transmitter 22 transmits the sensing data received by sensing data receiver 21 to remote autonomous driving server 10. Sensing data transmitter 22 transmits the sensing data to remote autonomous driving server 10, for example, via a communication interface or other components included in information processing device 20. Sensing data transmitter 22 can transmit the sensing data with less delay, for example, employing a data compression technique and a high-speed transmission technique such as 5G.

Autonomous driving system 23 executes first preprocessing based on the sensing data received by sensing data receiver 21 to receive a first processing result. The first preprocessing is preprocessing of the travel control processing in the autonomous driving processing of the autonomous driving vehicle. The first processing result is a result of the first preprocessing. For example, the preprocessing includes recognition processing or processing of determining the travel of the autonomous driving vehicle. The recognition processing includes the processing of recognizing the environment of the autonomous driving vehicle. The environment includes the position of the autonomous driving vehicle itself, surrounding objects, the road condition, the weather, or the traffic conditions. Specifically, the preprocessing includes the processing of estimating the autonomous driving vehicle itself, the processing of detecting the objects around the autonomous driving vehicle, the processing of predicting the movements of the objects around the autonomous driving vehicle, the processing of determining the travel of the autonomous driving vehicle, or the processing of planning the route of the autonomous driving vehicle, for example. For example, autonomous driving system 23 may perform these processing based on learning models. For example, the processing result includes the result of recognition, or the result of determining the travel of the autonomous driving vehicle. Specifically, the processing result includes the result of estimating the position of the autonomous driving vehicle itself, the result of detecting the objects around the autonomous driving vehicle, the result of predicting the movements of the objects around the autonomous driving vehicle, the result of determining the travel of the autonomous driving vehicle, or the result of planning the route of the autonomous driving vehicle, for example.

First processing result transmitter 24 transmits, to remote autonomous driving server 10, the first processing result that is a result of the first preprocessing executed by autonomous driving system 23. First processing result transmitter 24 transmits the first processing result to remote autonomous driving server 10, for example, via a communication interface or other components included in information processing device 20.

Note that sensing data transmitter 22 may transmit only the sensing data used by autonomous driving system 23 for executing the first preprocessing. Alternatively, sensing data transmitter 22 may transmit not only the sensing data used by autonomous driving system 23 for executing the first preprocessing but also the sensing data not used for executing the first preprocessing (e.g., high-resolution sensing data which cannot be handled by autonomous driving system 23).

Processing result changer 25 changes the first processing result to a third processing result based on a change request received from remote autonomous driving server 10. That is, processing result changer 25 changes the first processing result to the third processing result. The third processing result is then used in place of the first processing result which was originally to be used for the travel control of the autonomous driving vehicle.

Communication checker 26 checks the status of the wireless communications between the autonomous driving vehicle and remote autonomous driving server 10. For example, communication checker 26 transmits an inquiry to remote autonomous driving server 10 via a communication interface or other components included in information processing device 20. In accordance with a response to the inquiry, communication checker 26 checks the communication status. Specifically, if there is no response to the inquiry, communication checker 26 determines that there is no communicative connection. If there is a delay in a response to the inquiry, communication checker 26 determines that there is a communication delay. Upon determination that there is no communicative connection or a communication delay, communication checker 26 transmits, to travel restrictor 27, a travel restriction request to restrict the travel.

Travel restrictor 27 restricts the travel of the autonomous driving vehicle based on the travel restriction request. Specifically, travel restrictor 27 reduces the speed of the autonomous driving vehicle, stops the autonomous driving vehicle, or increases the collision avoidance margin. Accordingly, even if there is a communication disturbance between the autonomous driving vehicle and remote autonomous driving server 10, the safety of the autonomous driving vehicle is maintained.

Remote autonomous driving server 10 is a computer including a processor, a memory, a communication interface, and other components. Remote autonomous driving server 10 is an example of an information processing system wirelessly communicative with the autonomous driving vehicle. The memory is a ROM or a RAM, for example, capable of storing the programs to be executed by the processor. Remote autonomous driving server 10 includes sensing data receiver 11, remote autonomous driving system 12, first processing result receiver 13, difference determiner 14, and change request transmitter 15. Each of sensing data receiver 11, remote autonomous driving system 12, first processing result receiver 13, difference determiner 14, and change request transmitter 15 may be a processor, for example, that executes the programs stored in the memory. Note that the constituent elements of remote autonomous driving server 10 may be distributed in a plurality of servers.

Sensing data receiver 11 receives the sensing data received by the autonomous driving vehicle from the autonomous driving vehicle. For example, sensing data receiver 11 receives the sensing data transmitted from the autonomous driving vehicle and received via a communication interface or other components included remote autonomous driving server 10.

Remote autonomous driving system 12 executes the second preprocessing based on the sensing data received by sensing data receiver 11 to receive a second processing result. The second preprocessing is preprocessing of the travel control processing in the autonomous driving of the autonomous driving vehicle. The second preprocessing is more advanced than the first preprocessing. For example, remote autonomous driving system 12 may perform the second preprocessing based on learning models. The second processing result is a result of the second preprocessing.

For example, in view of the costs, the power consumption, the space, and other aspects, limited computers are mountable on an autonomous driving vehicle. The resources used by autonomous driving system 23 or the amount of calculating an algorithm is thus reduced. Here, the resources include the amount of processing, processing speed, memory capacity, electric power, or other characteristics of the processor. On the other hand, in remote autonomous driving server 1, the costs, power consumption, space, or other aspects are less limited. Accordingly, the resources used by remote autonomous driving system 12 and the amount of calculating the algorithm increase. As a result, the second preprocessing executed by remote autonomous driving server 10 is more advanced than the first preprocessing executed by information processing device 20 mounted on the autonomous driving vehicle. For example, the first preprocessing is executed using a first resource (e.g., a smaller resource of the autonomous driving vehicle) and the second preprocessing is executed using a second resource (e.g., a larger resource of remote autonomous driving server 10) different from the first resource. Accordingly, the second preprocessing is more advanced than the first preprocessing. Specifically, the second resource is richer than the first resource. For example, the first preprocessing is executed using a first algorithm (e.g., the algorithm capable of handling a smaller amount of calculation in the autonomous driving vehicle) and the second preprocessing is executed using a second algorithm (e.g., the algorithm capable of handling a larger amount of calculation in remote autonomous driving server 10) different from the first algorithm. Accordingly, the second preprocessing is more advanced than the first preprocessing. Specifically, the second algorithm is more advanced than the first algorithm. Note that the first preprocessing may be executed based on both the first resource and the first algorithm, whereas the second preprocessing may be executed based on both the second resource and the second algorithm.

First processing result receiver 13 receives the first processing result from the autonomous driving vehicle. For example, first processing result receiver 13 receives the first processing result transmitted from the autonomous driving vehicle and received via a communication interface or other components included in remote autonomous driving server 10.

Difference determiner 14 determines the difference between the first processing result received by first processing result receiver 13 and the second processing result received by remote autonomous driving system 12. Detailed operation of difference determiner 14 will be described later.

In accordance with the difference determined by difference determiner 14, change request transmitter 15 outputs, to the autonomous driving vehicle, a change request to change the first processing result to a third processing result. That is, change request transmitter 15 instructs the autonomous driving vehicle to change the first processing result to the third processing result. The third processing result is then used in place of the first processing result which was originally to be used for the travel control of the autonomous driving vehicle. A specific example of the third processing result will be described later.

Next, an operation of remote autonomous driving server 10 will be described with reference to FIG. 2.

Figure 2:
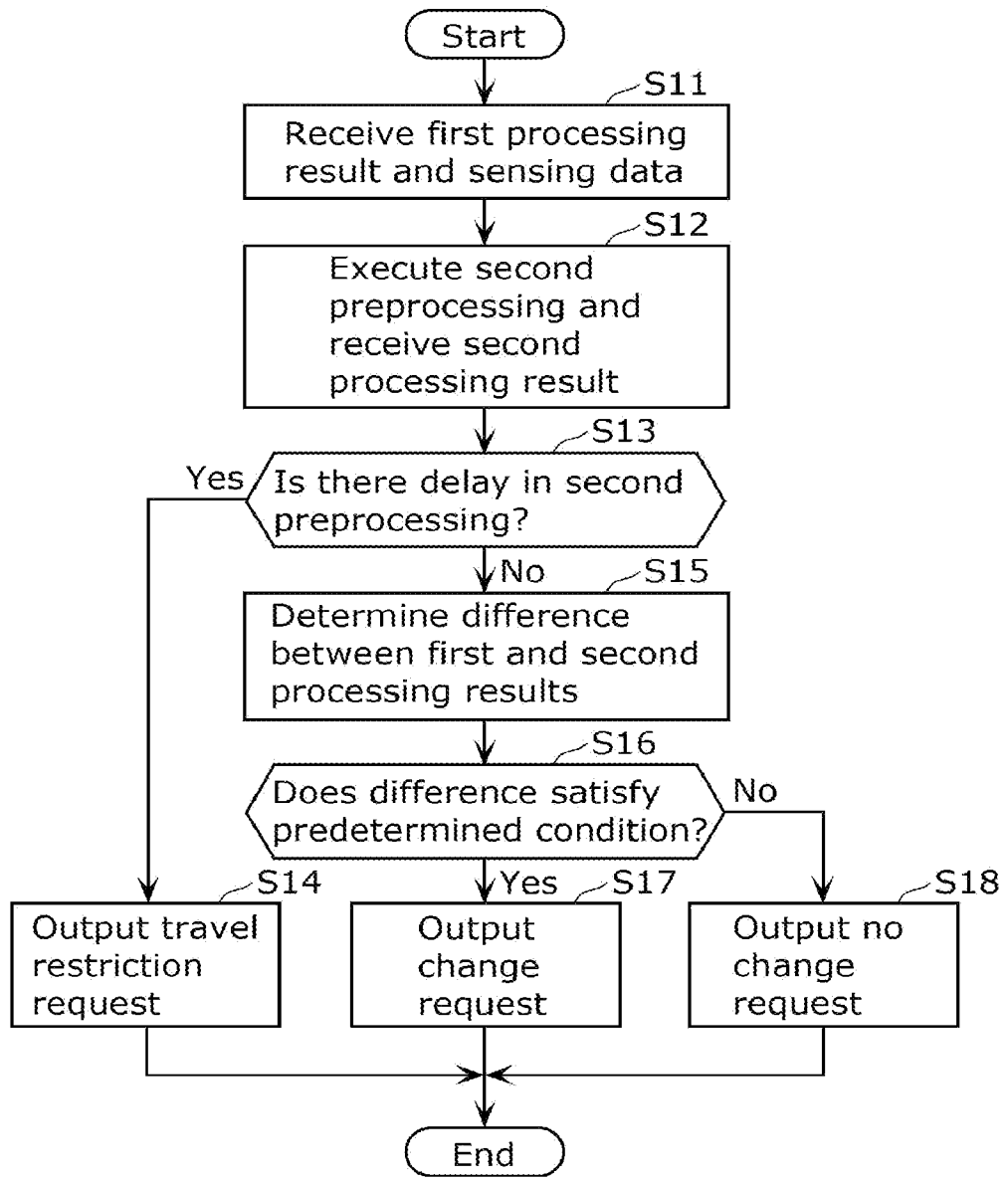
FIG. 2 is a flowchart showing an example of an information processing method according to Embodiment 1.

FIG. 2 is a flowchart showing an example of an information processing method according to Embodiment 1. For example, the information processing method according to Embodiment 1 is executed by a computer (specifically, a processor) included in remote autonomous driving server 10. FIG. 2 is thus also a flowchart showing the operation of remote autonomous driving server 10.

First, remote autonomous driving server 10 receives, from the autonomous driving vehicle, a first processing result and the sensing data received by the autonomous driving vehicle (step S11). The first processing result is a result of first preprocessing which is the preprocessing of the travel control processing in the autonomous driving processing of the autonomous driving vehicle. For example, remote autonomous driving server 10 receives a result of detection processing. The result is received by the autonomous driving vehicle through the processing of detecting the obstacles (e.g., number or positions of the obstacles) around the autonomous driving vehicle based on the sensing data. For example, remote autonomous driving server 10 receives a result of estimation processing. The result is received by the autonomous driving vehicle through the processing of estimating the position of the autonomous driving vehicle based on the sensing data. For example, remote autonomous driving server 10 receives a result of travel determination processing. The result is received by the autonomous driving vehicle through the processing of determining (e.g., whether to continue or stop) the travel of the autonomous driving vehicle based on the sensing data.

Next, remote autonomous driving server 10 executes second preprocessing, which is more advanced than the first preprocessing, based on the sensing data to receive a second processing result (step S12). For example, remote autonomous driving server 10 performs the processing of detecting the obstacles (e.g., the number or positions of the obstacles) around the autonomous driving vehicle based on the sensing data to receive a result of the detection processing. For example, remote autonomous driving server 10 performs the processing of estimating the position of the autonomous driving vehicle based on the sensing data to receive a result of the estimation processing. For example, remote autonomous driving server 10 performs the processing of determining (e.g., whether to continue or stop) the travel of the autonomous driving vehicle based on the sensing data to receive a result of the travel determination processing.

Then, remote autonomous driving server 10 determines whether there is a delay in the second preprocessing (step S13). For example, remote autonomous driving server 10 has the resources for the second preprocessing at a higher occupancy, and there may be a delay in the second preprocessing.

If there is a delay in the second preprocessing (Yes in step S13), remote autonomous driving server 10 outputs a request to restrict the travel of the autonomous driving vehicle (step S14). For example, the travel of the autonomous driving vehicle may be controlled possibly without any delay after the sensing data has been received. If it takes time from the receipt of the sensing data to the travel control based on the preprocessing results, the autonomous driving vehicle moves largely from the point in which the sensing data has been received. The result of the preprocessing executed based on the sensing data may be invalid in the current position of the autonomous driving vehicle away from the point in which the sensing data has been received. If there is a delay in the second preprocessing, the autonomous driving vehicle may fail to effectively utilize the result of the advanced second preprocessing by remote autonomous driving server 10 and may be in danger. Thus, remote autonomous driving server 10 outputs the request to restrict the travel of the autonomous driving vehicle to the autonomous driving vehicle. The request to restrict the travel of the autonomous driving vehicle is, for example, to reduce the speed of the autonomous driving vehicle, to stop the autonomous driving vehicle, or to increase the collision avoidance margin. Note that remote autonomous driving server 10 may transmit an alert to the autonomous driving vehicle, if there is a delay in the second preprocessing.

If there is no delay in the second preprocessing (No in step S13), remote autonomous driving server 10 determines the difference between the first and second processing results (step S15). For example, remote autonomous driving server 10 determines the difference between the number of the obstacles indicated by the first processing result and the number of the obstacles indicated by the second processing result. For example, remote autonomous driving server 10 determines the difference between the positions of the obstacles indicated by the first processing result and the positions of the obstacles indicated by the second processing result (e.g., root mean square (RMS) errors of the positions of the obstacles indicated by the first processing result where the positions of the obstacles indicated by the second processing result are correct). For example, remote autonomous driving server 10 determines the difference between the position of the autonomous driving vehicle indicated by the first processing result and the position of the autonomous driving vehicle indicated by the second processing result (e.g., the RMS error of the position of the autonomous driving vehicle indicated by the first processing result where the position of the autonomous driving vehicle indicated by the second processing result is correct). For example, remote autonomous driving server 10 determines the difference between the result of the processing of determining the travel of the autonomous driving vehicle indicated by the first processing result and the result of the processing of determining the travel of the autonomous driving vehicle indicated by the second processing result (e.g., the number of times when the travel determination processing result indicated by the first processing result differs from the travel determination processing result indicated by the second processing result within a certain period). Note that these are mere examples of the difference to be determined and the difference is not limited thereto.

After that, remote autonomous driving server 10 determines whether the determined difference satisfies a predetermined condition (step S16). The predetermined condition is related to the degree of the determined difference, for example. For example, remote autonomous driving server 10 determines whether the number of the obstacles indicated by the first processing result differs from the number of the obstacles indicated by the second processing result. For example, remote autonomous driving server determines whether the RMS error is greater than or equal to a predetermined threshold. For example, remote autonomous driving server 10 determines whether the number of the times when the travel determination processing result indicated by the first processing result differs from the travel determination processing result indicated by the second processing result within the certain period is larger than or equal to a predetermined threshold. Note that these are mere examples of the predetermined condition and the condition is not limited thereto.

If the determined difference satisfies the predetermined condition (Yes in step S16), remote autonomous driving server 10 outputs, to the autonomous driving vehicle, a change request to change the first processing result to the third processing result (step S17). The case "[i]f the determined difference satisfies the predetermined condition" includes the following cases, for example. the number of the obstacles indicated by the first processing result differs from the number of the obstacles indicated by the second processing result. The RMS error is greater than or equal to the predetermined threshold. The number of the times when the travel determination processing result indicated by the first processing result differs from the travel determination processing result indicated by the second processing result within the certain period is larger than or equal to the predetermined threshold.

The third processing result is received based on at least one of the first or second processing result. Since the second processing result is a result of the advanced second preprocessing, the third processing result as a result of the processing based on the second processing result is also an advanced processing result. For example, the third processing result may be the second processing result. Not the first processing result but the second processing result that is a result of the advanced second preprocessing is thus used for the travel control of the autonomous driving vehicle. Accordingly, the performance in the autonomous driving improves. For example, the third processing result may be received by correcting the first processing result based on the determined difference. For example, a necessary or processable range of the first processing result is corrected based on the difference between the first and second processing results. Not the first processing result but a result (i.e., the corrected first processing result) received by correcting the first processing result based on the difference between the first processing result and the second processing result that is a result of the advanced second preprocessing is thus used for the travel control of the autonomous driving vehicle. Accordingly, the performance in the autonomous driving improves.

If the determined difference satisfies the predetermined condition (Yes in step S16), remote autonomous driving server 10 may output a request to restrict the travel of the autonomous driving vehicle. In this case, remote autonomous driving server 10 may notify a remote observer or an occupant of the autonomous driving vehicle of an anomality.

If the determined difference does not satisfy the predetermined condition (No in step S16), remote autonomous driving server 10 outputs no change request to the autonomous driving vehicle (step S18). The case "[i]f the determined difference does not satisfy the predetermined condition" includes the following cases, for example. The number of the obstacles indicated by the first processing result is equal to the number of the obstacles indicated by the second processing result. The RMS error is smaller than the predetermined threshold. The number of the times when the travel determination processing result indicated by the first processing result differs from the travel determination processing result indicated by the second processing result within the certain period is smaller than the predetermined threshold. In this case, for example, the first processing result is not inferior to the second processing result. The autonomous driving vehicle receives no change request. The travel of the autonomous driving vehicle is controlled using the first processing result that is not inferior to the second processing result. In other words, the first processing result is used for the travel control of the autonomous driving vehicle after confirming that the first processing result is not inferior to the second processing result or the inferiority of the first processing result to the second processing result falls within an acceptable range.

Receiving the change request with a delay due to the communication delay, the autonomous driving vehicle may ignore the received change request and restrict the travel of the autonomous driving vehicle. As in the case where there is a delay in the second preprocessing, the autonomous driving vehicle may fail to effectively utilize the third processing result and may be in danger, even if the first processing result is changed to the third processing result.

Note that the sensing data received by the autonomous driving vehicle may be susceptible by the weather. Even if autonomous driving system 23 executes the first preprocessing using the sensing data susceptible by the weather, no correct first processing result may be received. For example, if it is raining or clouded and the visibility is poor around the autonomous driving vehicle, the obstacles around the autonomous driving vehicle cannot be recognized correctly. To address the problem, whether the weather is suitable for the autonomous driving by autonomous driving system 23 may be determined. This respect will be described with reference to FIG. 3.

Figure 3:
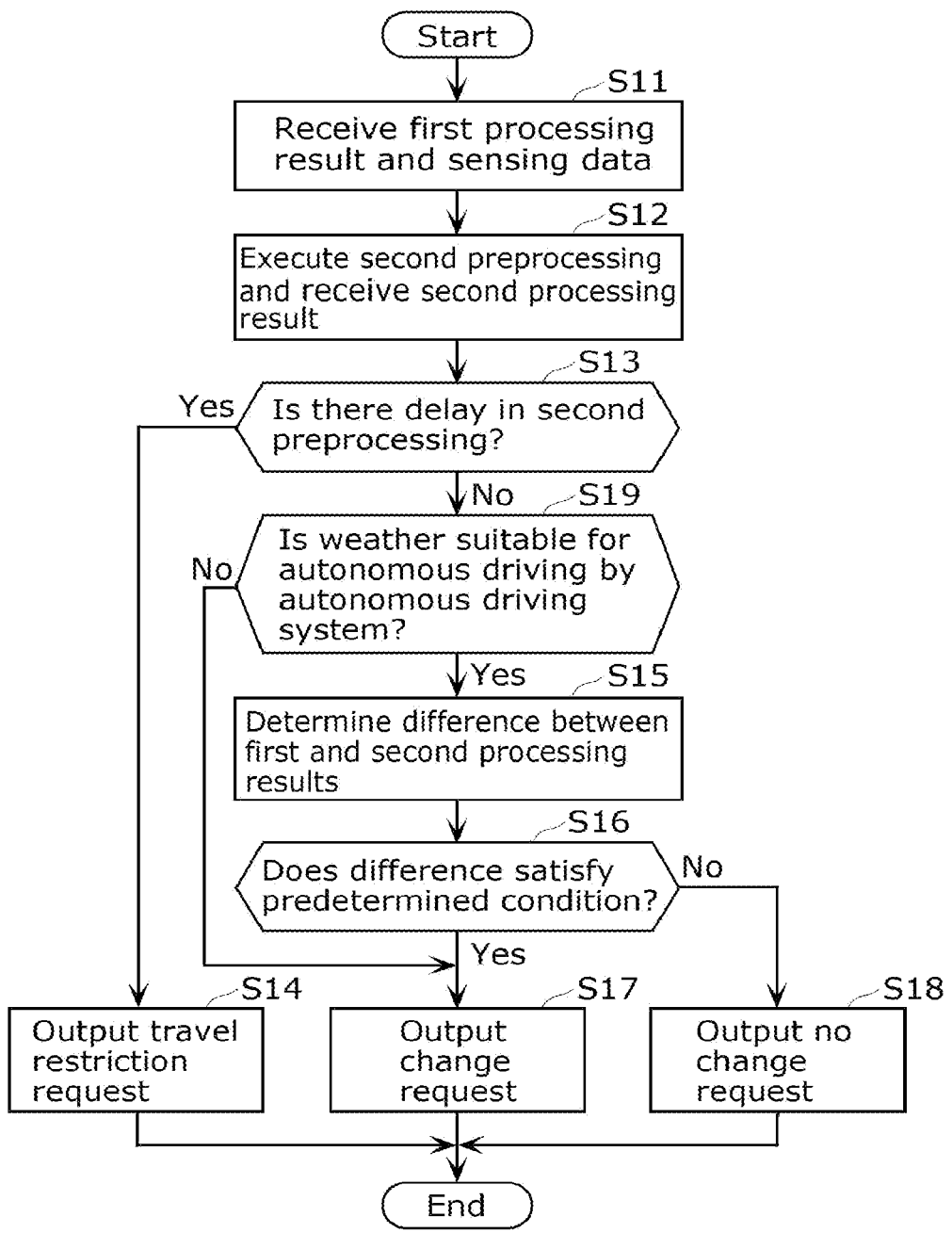
FIG. 3 is a flowchart showing another example of the information processing method according to Embodiment 1.

FIG. 3 is a flowchart showing another example of the information processing method according to Embodiment 1.

Unlike the flowchart shown in FIG. 2, the flowchart shown in FIG. 3 includes additional step S19. The other respects (i.e., steps S11 to S18) are the same as those shown in FIG. 2. The description thereof will thus be omitted.

If there is no delay in the second preprocessing (No in step S13), remote autonomous driving server 10 determines whether the weather is suitable for the autonomous driving by autonomous driving system 23 (step S19). For example, if the weather is fine, remote autonomous driving server 10 determines that the weather is suitable for the autonomous driving by autonomous driving system 23. If it is raining or clouded, remote autonomous driving server 10 determines that the weather is not suitable for the autonomous driving by autonomous driving system 23.

If the weather is not suitable for the autonomous driving by autonomous driving system 23 (No in step S19), remote autonomous driving server 10 outputs a change request (step S17) without performing any processing of determining the difference between the first and second processing results in step S15. This is because, if the weather is not suitable for the autonomous driving by autonomous driving system 23, it is assumable that the first processing result is inferior to the second processing result without taking any extra time for the difference determination.

If the weather is suitable for the autonomous driving by autonomous driving system 23 (Yes in step S19), remote autonomous driving server 10 performs the processing in step S15 and the subsequent steps as described in FIG. 2. This is because, if the weather is suitable for the autonomous driving by autonomous driving system 23, the first processing result may not be inferior to the second processing result, and it is thus better to determine the difference to determine whether a change request is to be output.

In this manner, whether the weather is suitable for the autonomous driving by autonomous driving system 23 may be determined.

As described above, in view of the costs, the power consumption, the space, and other aspects, limited computers are mountable on autonomous driving vehicle (specifically, information processing device 20 mounted on the autonomous driving vehicle). In the autonomous moving body, in addition to the executed first preprocessing, the second preprocessing that is more advanced than the first preprocessing is executed by remote autonomous driving server 10 in which the costs, the power consumption, the space, or other aspects are less limited. The difference between the first processing result that is a result of the first preprocessing and the second processing result that is a result of the second preprocessing is determined. In accordance with the difference, a change request to change the first processing result to a third processing result is output to the autonomous driving vehicle. The first processing result is the result of the first preprocessing that is the preprocessing of the travel control processing of the autonomous driving vehicle. The third processing result is based on the second processing result that is the result of the advanced second preprocessing. Alternatively, in accordance with the difference, the change request to change the first processing result to a third processing result that is received by correcting or limiting, for example, the first processing result is output to the autonomous moving body. The third processing result that is more advanced than the first processing result is thus used for the travel control processing of the autonomous moving body. Accordingly, the performance in autonomous movement improves. For example, with an improvement in the performance in the autonomous driving, the travelable area of the autonomous driving vehicle increases.

Variation of Embodiment 1

For example, the remote autonomous driving server may start executing the second preprocessing, for example, upon request by the autonomous driving vehicle. This respect will be described as a variation of Embodiment 1 with reference to FIGS. 4 and 5.

Figure 4:
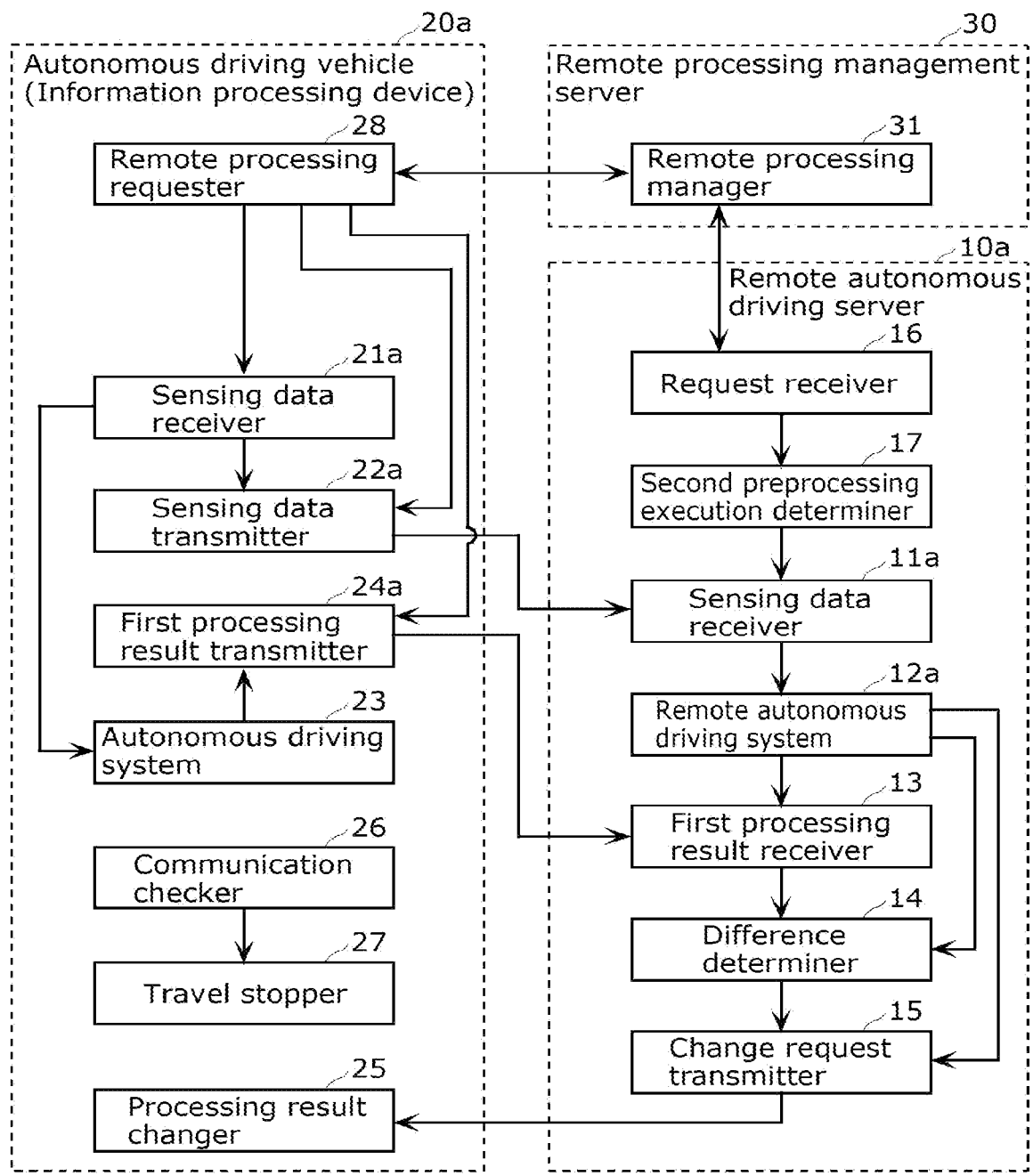
FIG. 4 is a block diagram showing an example of an autonomous driving vehicle, a remote autonomous driving server, and a remote processing management server according to a variation of Embodiment 1.

FIG. 4 is a block diagram showing an example of an autonomous driving vehicle (specifically, information processing device 20a mounted on the autonomous driving vehicle), remote autonomous driving server 10a, and remote processing management server 30 according to the variation of Embodiment 1.

Information processing device 20a further includes remote processing requester 28, and includes sensing data receiver 21a, sensing data transmitter 22a, and first processing result transmitter 24a in place of sensing data receiver 21, sensing data transmitter 22, and first processing result transmitter 24. In these respects, information processing device 20a differs from information processing device 20 according to Embodiment 1. In other respects, information processing device 20a has the same configuration as information processing device 20. The description thereof will thus be omitted. Like the other constituent elements, remote processing requester 28 may be a processor, for example, that executes the programs stored in the memory.

Remote processing requester 28 outputs a request to execute the second preprocessing to remote autonomous driving server 10a via remote processing management server 30. For example, assume that there a plurality of remote autonomous driving servers 10a that function to execute the second preprocessing. In this case, upon receipt of the request, remote processing manager 31 of remote processing management server 30 inquires of the plurality of remote autonomous driving servers 10a whether the second preprocessing is executable. In accordance with the result of the inquiry, remote processing manager 31 selects remote autonomous driving server(s) 10a capable of executing the second preprocessing, out of the plurality of remote autonomous driving servers 10a. Remote processing manager 31 notifies the autonomous driving vehicle of selected remote autonomous driving server(s) 10a. Remote processing requester 28 instructs sensing data receiver 21a to receive the sensing data, sensing data transmitter 22a to transmit the sensing data to selected remote autonomous driving server(s) 10a, and first processing result transmitter 24a to transmit the first processing result to selected remote autonomous driving server(s) 10a.

Receiving a request from remote processing requester 28, sensing data receiver 21a receives the sensing data from the sensors included in the autonomous driving vehicle. In other respects, sensing data receiver 21a is the same as sensing data receiver 21. The description thereof will thus be omitted.

Sensing data transmitter 22a transmits the sensing data received by sensing data receiver 21a to selected remote autonomous driving server(s) 10a. In other respects, sensing data transmitter 22a is the same as sensing data transmitter 22. The description thereof will thus be omitted.

First processing result transmitter 24a transmits the first processing result to selected remote autonomous driving server(s) 10a. The first processing result is a result of the first preprocessing executed by autonomous driving system 23. In other respects, first processing result transmitter 24a is the same as first processing result transmitter 24. The description thereof will thus be omitted.

Remote autonomous driving server 10a further includes request receiver 16 and second preprocessing execution determiner 17, and includes sensing data receiver 11a and remote autonomous driving system 12a in place of sensing data receiver 11 and remote autonomous driving system 12. In these respects, remote autonomous driving server 10a differs from remote autonomous driving server 10 according to Embodiment 1. In other respects, remote autonomous driving server 10a has the same configuration as remote autonomous driving server 10. The description thereof will thus be omitted. Like the other constituent elements, each of request receiver 16 and second preprocessing execution determiner 17 may be a processor, for example, that executes the programs stored in the memory.

Request receiver 16 receives a request to execute the second preprocessing from the autonomous driving vehicle. For example, request receiver 16 receives a request to execute the second preprocessing from the autonomous driving vehicle via remote processing management server 30.

Second preprocessing execution determiner 17 determines whether to execute the second preprocessing upon receipt of a request. For example, second preprocessing execution determiner 17 may determine whether to execute the second preprocessing based on the state of the tasks or resources of remote autonomous driving server 10a. For example, second preprocessing execution determiner 17 determines not to execute the second preprocessing, if remote autonomous driving server 10a executes a lot of tasks or has a smaller amount of the resource. For example, second preprocessing execution determiner 17 may determine whether to execute the second preprocessing based on at least one of the resources of the autonomous driving vehicle, the moving conditions of the autonomous driving vehicle, the environment outside the autonomous driving vehicle, the time, or the response time to a request. The moving conditions include the moving speed, acceleration, deceleration, moving direction (steering angle) or other conditions of the autonomous driving vehicle. For example, second preprocessing execution determiner 17 determines to execute the second preprocessing in the following cases. The autonomous driving vehicle has insufficient resources. The autonomous driving vehicle is moving under the conditions such as at a higher vehicle speed, with greater acceleration, or at a greater steering angle. The environment outside the autonomous driving vehicle is as follows. There are obstacles close to the autonomous driving vehicle. There are a large number of obstacles. There is a moving body as an obstacle. The autonomous driving vehicle is in heavy traffic (e.g., at an intersection). It is dark outside. It is raining or clouded. It is the nighttime. There is a response to a request in a short time. For example, second preprocessing execution determiner 17 determines not to execute the second preprocessing in the following cases. The autonomous driving vehicle has sufficient resources. The autonomous driving vehicle is moving under the conditions such as at a lower vehicle speed, with smaller acceleration, or at a smaller steering angle. The environment outside the autonomous driving vehicle is as follows. There are obstacles far from the autonomous driving vehicle. There are a small number of obstacles. There is no moving body as an obstacle. The autonomous driving vehicle is in light traffic. It is blight outside. The weather is fine. It is the daytime. There is a response to a request after a long time.

In this manner, upon receipt of a request, the performance in the autonomous driving may not be improved even by executing the second preprocessing, depending on conditions. For example, the depending on the following conditions, the performance in the autonomous driving may not be improved by executing the second preprocessing and controlling the travel of the autonomous driving vehicle using the third processing result. The conditions include resources of the autonomous driving vehicle, the moving conditions of the autonomous driving vehicle, the environment outside the autonomous driving vehicle, the time, and the response time to a request. In such cases, remote autonomous driving server 10a rejects or ignores the request.

When the second preprocessing is determined to be executed upon receipt of a request from the autonomous driving vehicle, sensing data receiver 11a receives the sensing data. In other respects, sensing data receiver 11a is the same as sensing data receiver 11. The description thereof will thus be omitted.

Remote autonomous driving system 12a executes the second preprocessing based on the sensing data to receive a second processing result. The sensing data is received by sensing data receiver 11a when the second preprocessing is determined to be executed upon receipt of a request from the autonomous driving vehicle. In other respects, remote autonomous driving system 12a is the same as remote autonomous driving system 12. The description thereof will thus be omitted.

Next, an operation of remote autonomous driving server 10a will be described with reference to FIG. 5.

Figure 5:
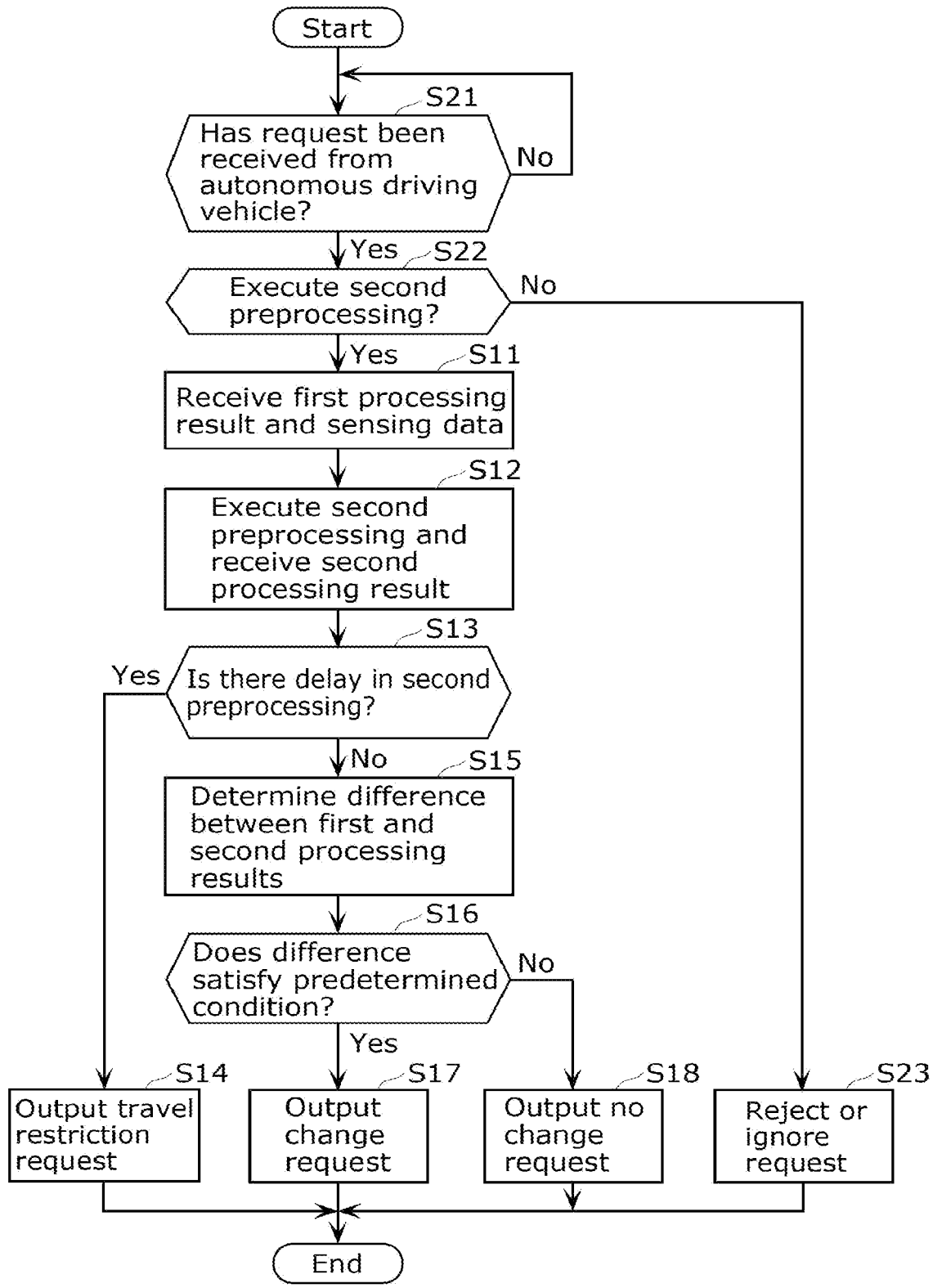
FIG. 5 is a flowchart showing an example of an information processing method according to the variation of Embodiment 1.

FIG. 5 is a flowchart showing an example of an information processing method according to a variation of Embodiment 1. For example, the information processing method according to the variation of Embodiment 1 is executed by a computer (specifically, a processor) included in remote autonomous driving server 10a. FIG. is thus also a flowchart showing the operation of remote autonomous driving server 10a.

Unlike the flowchart shown in FIG. 2, the flowchart shown in FIG. 5 further includes additional steps S21, S22, and S23. The other respects (i.e., steps S11 to S18) are the same as those shown in FIG. 2. The description thereof will thus be omitted.

Remote autonomous driving server 10a determines whether a request to execute the second preprocessing has been received from the autonomous driving vehicle (step S21).

If no request to execute the second preprocessing has been received from the autonomous driving vehicle (No in step S21), remote autonomous driving server 10a repeats the processing in step S21 until receiving a request.

If a request to execute the second preprocessing has been received from the autonomous driving vehicle (Yes in step S21), remote autonomous driving server 10a determines whether to execute the second preprocessing (step S22).

If it is determined not to execute the second preprocessing (No in step S22), remote autonomous driving server 10a rejects or ignores the request (step S23). Accordingly, for example, remote processing management server 30 does not select remote autonomous driving server 10a that has rejected or ignored the request as the server to execute the second preprocessing. Remote processing management server 30 selects a server to execute the second preprocessing from the other ones of remote autonomous driving servers 10a. If all remote autonomous driving servers 10a have rejected or ignored the request, remote processing management server 30 may instruct the autonomous driving vehicle to restrict the travel.

If it is determined to execute the second preprocessing (Yes in step S22), remote autonomous driving server 10a performs the processing in step S11 and the subsequent steps, as described with reference to FIG. 2.

Note that a request from the autonomous driving vehicle may include information designating specific processing out of the second preprocessing. In this case, remote autonomous driving server 10a executes the specific processing to receive a second processing result in step S12. This is because, depending on the moving conditions, the external environment, or other conditions of the autonomous driving vehicle, the difference may be determined only in the specific processing (e.g., only the obstacle detection processing or only the travel determination processing). This allows remote autonomous driving server 10a to selectively execute the specific processing designated out of the second preprocessing, for example, as desired by the autonomous driving vehicle. If only the obstacle detection is performed, the area for the obstacle detection may be limited. For example, if the autonomous driving vehicle changes lanes, the obstacle detection may be performed in the new lane after the change.

Assume that remote processing management server 30 receives requests from a plurality of autonomous driving vehicles. In this case, remote processing management server 30 may select one autonomous driving vehicle whose request is preferentially received based on at least one of the resources of the autonomous driving vehicles, the moving conditions of the autonomous driving vehicles, the environments outside the autonomous driving vehicles, times, or the response times to the requests.

As described above, remote autonomous driving server 10a may start executing the second preprocessing, for example, upon request by the autonomous driving vehicle. Accordingly, remote autonomous driving server 10a allows the execution of the second preprocessing, when the autonomous driving vehicle requests the execution of the advanced second preprocessing.

Embodiment 2

An example has been described in Embodiment 1 where remote autonomous driving server 10 determines the difference between the first and second processing results. This determination may be however made by an information processing device mounted on an autonomous driving vehicle. This respect will be described as Embodiment 2 with reference to FIGS. 6 and 7.

Figure 6:
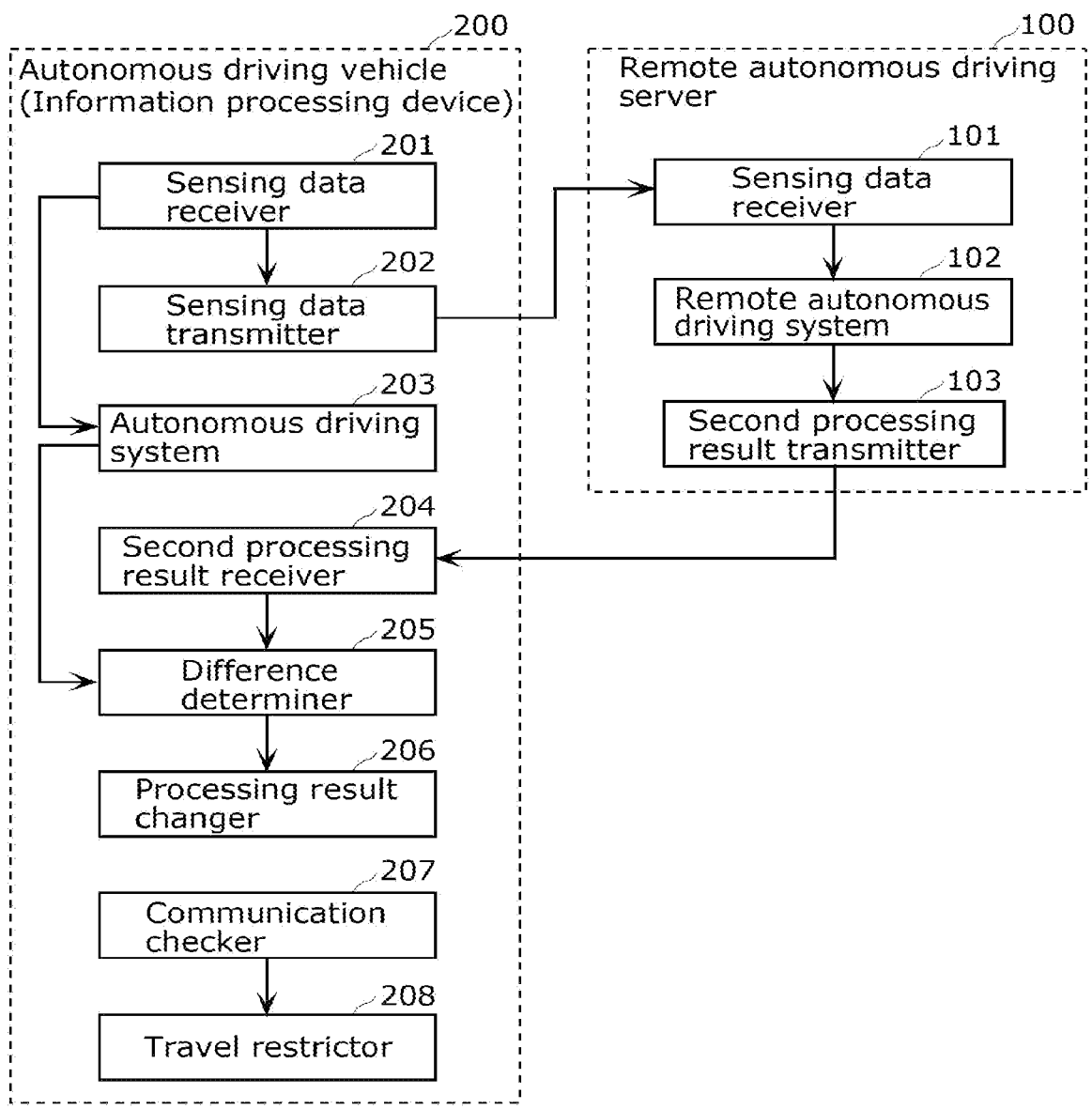
FIG. 6 is a block diagram showing an example of an autonomous driving vehicle and a remote autonomous driving server according to Embodiment 2.

FIG. 6 is a block diagram showing an example of an autonomous driving vehicle (specifically, information processing device 200 mounted on the autonomous driving vehicle) and remote autonomous driving server 100 according to Embodiment 2. Remote autonomous driving server 100 performs wireless communications with the autonomous driving vehicle.

The autonomous driving vehicle includes information processing device 200 mounted thereon. Information processing device 200 is a computer including a processor, a memory, a communication interface, and other components. The memory is a ROM or a RAM, for example, capable of storing the programs to be executed by the processor. Information processing device 200 includes sensing data receiver 201, sensing data transmitter 202, autonomous driving system 203, second processing result receiver 204, difference determiner 205, processing result changer 206, communication checker 207, and travel restrictor 208. Each of sensing data receiver 201, sensing data transmitter 202, autonomous driving system 203, second processing result receiver 204, difference determiner 205, processing result changer 206, communication checker 207, and travel restrictor 208 may be a processor, for example, that executes the programs stored in the memory.

Sensing data receiver 201, sensing data transmitter 202, autonomous driving system 203, communication checker 207, and travel restrictor 208 basically have the same functions as sensing data receiver 21, sensing data transmitter 22, autonomous driving system 23, communication checker 26, and travel restrictor 27 according to Embodiment 1. The description thereof will thus be omitted.

Second processing result receiver 204 receives a second processing result from remote autonomous driving server 100. The second processing result is a result of executing the second preprocessing, which is more advanced than the first preprocessing, based on the sensing data. For example, second processing result receiver 204 receives the second processing result transmitted from remote autonomous driving server 100 and received via a communication interface or other components included in the autonomous driving vehicle.

Difference determiner 205 determines the difference between the first processing result received by autonomous driving system 203 and the second processing result received by second processing result receiver 204. Difference determiner 205 according to Embodiment 2 is included in information processing device 200, whereas difference determiner 14 according to Embodiment 1 is included in remote autonomous driving server 10. In other respects, the functions are basically the same. The detailed description of difference determiner 205 will thus be omitted.

In accordance with the determined difference, processing result changer 206 changes the first processing result to a third processing result. An example has been described in Embodiment 1 where processing result changer 25 changes the first processing result to the third processing result in accordance with a change request from remote autonomous driving server 10. In Embodiment 2, processing result changer 206 changes the first processing result to the third processing result in accordance with the difference determined by the autonomous driving vehicle itself.

Remote autonomous driving server 100 is a computer including a processor, a memory, a communication interface, and other components. Remote autonomous driving server 100 is an example of an external device of information processing device 200. The memory is a ROM or a RAM, for example, capable of storing the programs to be executed by the processor. Remote autonomous driving server 100 includes sensing data receiver 101, remote autonomous driving system 102, and second processing result transmitter 103. Each of sensing data receiver 101, remote autonomous driving system 102, and second processing result transmitter 103 may be a processor, for example, that executes the programs stored in the memory. Note that the constituent elements of remote autonomous driving server 100 may be distributed in a plurality of servers.

Sensing data receiver 101 and remote autonomous driving system 102 basically have the same functions as sensing data receiver 11 and remote autonomous driving system 12 according to Embodiment 1. The description thereof will thus be omitted. Second processing result transmitter 103 transmits the second processing result to the autonomous driving vehicle. The second processing result is a result of the second preprocessing executed by remote autonomous driving system 102. Second processing result transmitter 103 transmits the second processing result to the autonomous driving vehicle via a communication interface or other components included in remote autonomous driving server 100.

In Embodiment 2, the second processing result is transmitted from remote autonomous driving server 100 to the autonomous driving vehicle. The difference between the first and second processing results is determined not by remote autonomous driving server 100 but by the autonomous driving vehicle.

Next, an operation of the autonomous driving vehicle will be described with reference to FIG. 7.

Figure 7:
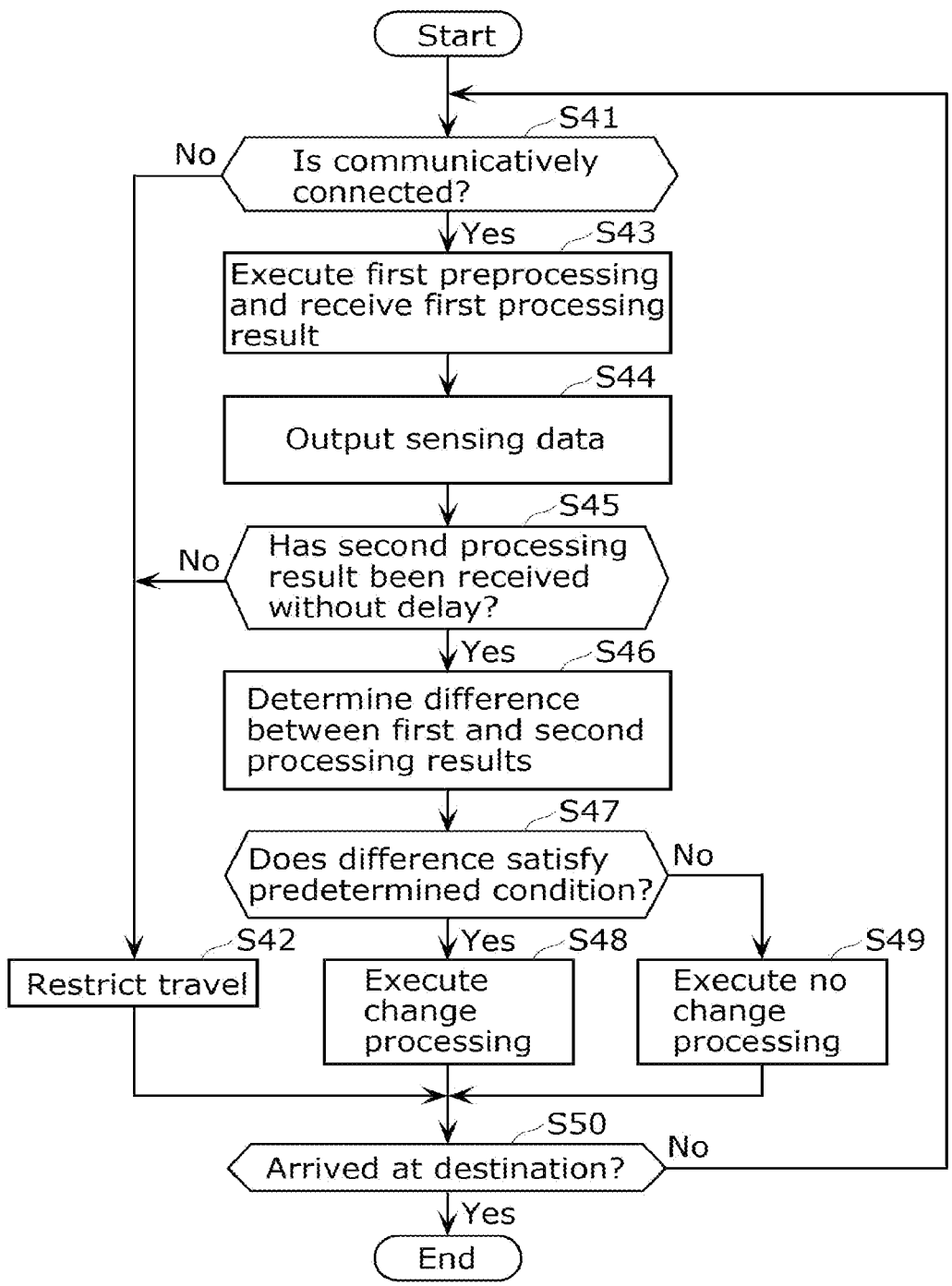
FIG. 7 is a flowchart showing an example operation of the autonomous driving vehicle according to Embodiment 2.

FIG. 7 is a flowchart showing an example operation of the autonomous driving vehicle (specifically, information processing device 200) according to Embodiment 2.

First, the autonomous driving vehicle determines whether the autonomous driving vehicle is communicatively connected to remote autonomous driving server 100 (step S41).

Not communicatively connected to remote autonomous driving server 100 (No in step S41), the autonomous driving vehicle restricts the travel of the autonomous driving vehicle (step S42). If the autonomous driving vehicle is not communicatively connected to remote autonomous driving server 100, the autonomous driving vehicle cannot receive the second processing result. That is, the autonomous driving vehicle fails to determine the difference between the first and second processing results and to change the first processing result to the third processing result. If the autonomous driving vehicle is not communicatively connected to remote autonomous driving server 100, the autonomous driving vehicle may be in danger. The travel of the autonomous driving vehicle is thus restricted. Accordingly, even if there is a communication disturbance between the autonomous driving vehicle and remote autonomous driving server 10, the safety of the autonomous driving vehicle is maintained.

Being communicatively connected to remote autonomous driving server 100 (Yes in step S41), the autonomous driving vehicle executes the first preprocessing based on the sensing data to receive a first processing result (step S43). The first preprocessing is preprocessing of the travel control processing in the autonomous driving of the autonomous driving vehicle. For example, the autonomous driving vehicle performs the processing of detecting the obstacles (e.g., the number or positions of the obstacles) around the autonomous driving vehicle based on the sensing data to receive a result of the detection processing. For example, the autonomous driving vehicle performs the processing of estimating the position of the autonomous driving vehicle based on the sensing data to receive a result of the estimation processing. For example, the autonomous driving vehicle performs the processing of determining (where to continue or stop) the travel of the autonomous driving vehicle based on the sensing data to receive a result of the travel determination processing.

Next, the autonomous driving vehicle outputs the sensing data received by the autonomous driving vehicle to remote autonomous driving server 100 (step S44). After receiving the sensing data, remote autonomous driving server 100 executes the second preprocessing, which is more advanced than the first preprocessing, based on the sensing data preprocessing to receive a second processing result. Remote autonomous driving server 100 then transmits the received second processing result to the autonomous driving vehicle.

Then, the autonomous driving vehicle determines whether the second processing result transmitted from remote autonomous driving server 100 has been received without any delay (step S45). For example, the autonomous driving vehicle determines that the second processing result has not been received without any delay, if the second processing result is received after a lapse of a predetermined time or more after the sensing data or the request has been output. If there is a communication delay between the autonomous driving vehicle and remote autonomous driving server 100, the second processing result may not have been received without any delay.

If the second processing result could not be received without any delay (No in step S45), the autonomous driving vehicle executes no difference determination but restricts the travel of the autonomous driving vehicle (step S42). This is because, as described in Embodiment 1 where there is a delay in the second preprocessing, the autonomous driving vehicle may fail to effectively utilize the third processing result and may be in danger, even if the first processing result is changed to the third processing result.

If the second processing result has been received without any delay (Yes in step S45), the autonomous driving vehicle determines the difference between the first and second processing results (step S46) and determines whether the determined difference satisfies the predetermined condition (step S47). The processing in steps S46 and S47 is performed by the autonomous driving vehicle. In other respects, the processing is the same as the processing in steps S15 and S16 described with reference to FIG. 2. The description thereof will thus be omitted.

If the determined difference satisfies the predetermined condition (Yes in step S47), the autonomous driving vehicle executes the processing of changing the first processing result to a third processing result (step S48). Using the third processing result, the travel control processing is executed. In this manner, not the first processing result but the third processing result based on the second processing result that is a result of the advanced second preprocessing is thus used for the travel control of the autonomous driving vehicle. Accordingly, the performance in the autonomous driving improves.

If the determined difference satisfies the predetermined condition (Yes in step S47), the autonomous driving vehicle may restrict the travel of the autonomous driving vehicle. In this case, the autonomous driving vehicle may notify a remote observer or an occupant of the autonomous driving vehicle of an anomality.

If the determined difference does not satisfy the predetermined condition (No in step S47), the autonomous driving vehicle executes no change processing (step S49). In this case, for example, the first processing result is not inferior to the second processing result. There is no need for the autonomous driving vehicle to change the first processing result to the third processing result. The travel of the autonomous driving vehicle is controlled using the first processing result that is not inferior to the second processing result.

The autonomous driving vehicle determines whether it has arrived at a destination (step S50). Not having arrived at the destination (No in step S50), the autonomous driving vehicle repeats the processing in steps S41 to S49 until arriving at the destination. Having arrived at the destination (Yes in step S50), the autonomous driving vehicle stops and the processing ends.

As described above, in view of the costs, the power consumption, the space, and other aspects, limited computers are mountable on an autonomous driving vehicle. In the autonomous driving vehicle, in addition to the executed first preprocessing, the second preprocessing that is more advanced than the first preprocessing is executed by an external device (e.g., remote autonomous driving server 100) in which the costs, the power consumption, the space, or other aspects are less limited. The second processing result that is a result of the second preprocessing is transmitted to the autonomous driving vehicle. The difference between the first processing result that is a result of the first preprocessing and a second processing result that is the result of the second preprocessing is determined by the autonomous driving vehicle. In accordance with the difference, the first processing result is changed to a third processing result. The first processing result is the result of the first preprocessing that is the preprocessing of the travel control processing of the autonomous driving vehicle. The third processing result is based on the second processing result that is the result of the advanced second preprocessing. Alternatively, in accordance with the difference, the first processing result is changed to a third processing result that is received by correcting or limiting, for example, the first processing result. The third processing result that is more advanced than the first processing result is thus used for the processing of controlling the travel of the autonomous driving vehicle. Accordingly, the performance in the autonomous driving improves. For example, with an improvement in the performance in the autonomous driving, the travelable area of the autonomous driving vehicle increases.

Variation of Embodiment 2

For example, the remote autonomous driving server may start executing the second preprocessing, for example, upon request by the autonomous driving vehicle. This respect will be described as a variation of Embodiment 2 with reference to FIGS. 8 and 9.

Figure 8:
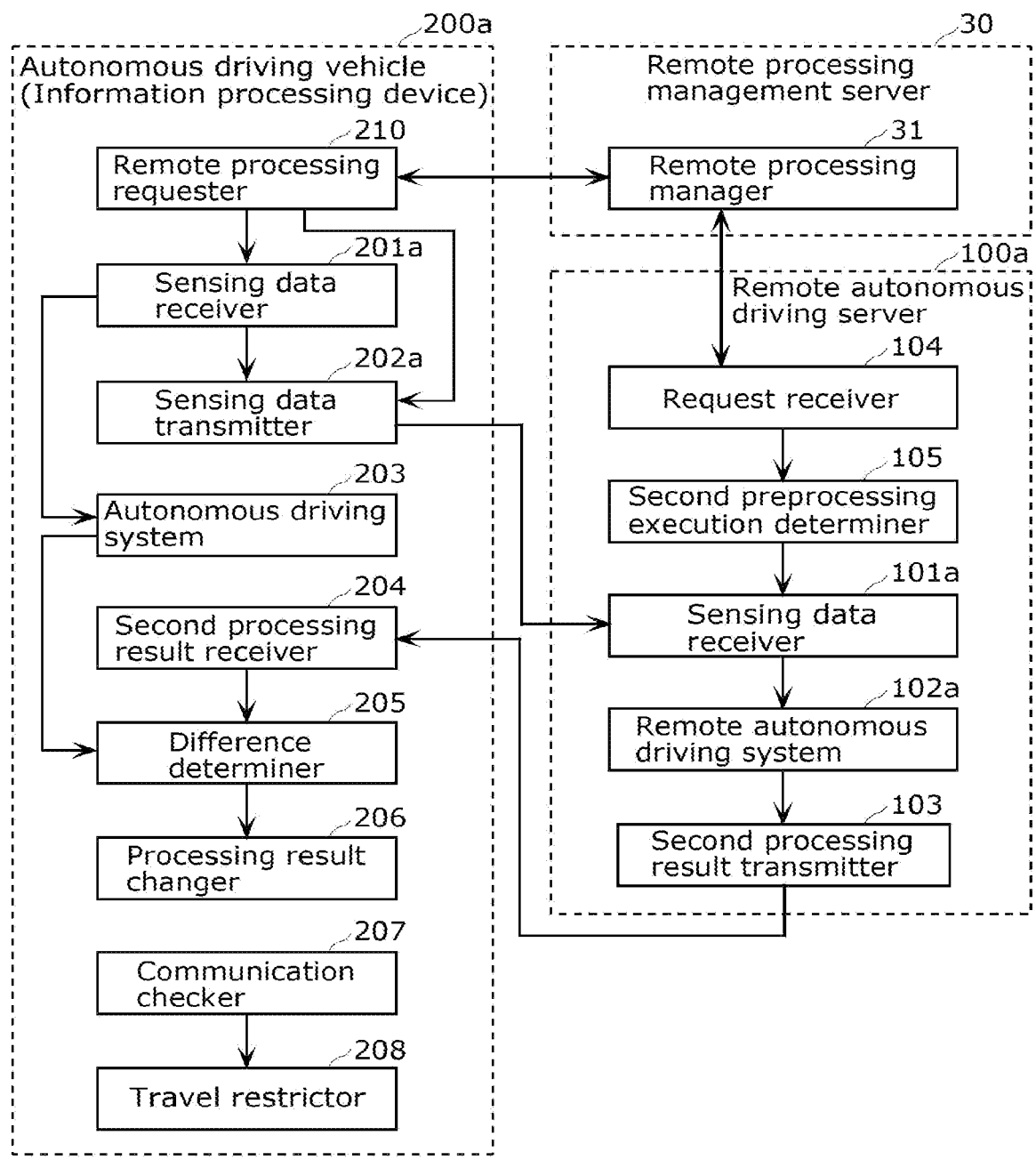
FIG. 8 is a block diagram showing an example of an autonomous driving vehicle, a remote autonomous driving server, and a remote processing management server according to a variation of Embodiment 2.

FIG. 8 is a block diagram showing an example of an autonomous driving vehicle (specifically, information processing device 200a mounted on the autonomous driving vehicle), remote autonomous driving server 100a, and remote processing management server 30 according to the variation of Embodiment 2.

Information processing device 200a further includes remote processing requester 210 and includes sensing data receiver 201a and sensing data transmitter 202a in place of sensing data receiver 201 and sensing data transmitter 202. In these respects, information processing device 200a differs from information processing device 200 according to Embodiment 2. In other respects, information processing device 200a has the same configuration as information processing device 200. The description thereof will thus be omitted. Like the other constituent elements, remote processing requester 210 may be a processor, for example, that executes the programs stored in the memory.

Remote processing requester 210 outputs a request to execute the second preprocessing to remote autonomous driving server 100a via remote processing management server 30. Since remote processing management server 30 basically has the same functions as in the variation of Embodiment 1, the description thereof will be omitted. For example, remote processing requester 210 may output a request to remote autonomous driving server 100a based on at least one of the resources of the autonomous driving vehicle, the moving conditions of the autonomous driving vehicle, the environment outside the autonomous driving vehicle, the time, or the response time to the inquiry to remote autonomous driving server 100a. For example, a request is output in the following cases. The autonomous driving vehicle has insufficient resources. The autonomous driving vehicle is moving under the conditions such as at a higher vehicle speed, with greater acceleration, or a greater steering angle. The environment outside the autonomous driving vehicle is as follows. There are obstacles close to the autonomous driving vehicle. There are a large number of obstacles. There is a moving body as an obstacle. The autonomous driving vehicle is in heavy traffic (e.g., at an intersection). It is dark outside. It is raining or clouded. It is the nighttime. There is a response to a request in a short time.

For example, no request is output in the following cases. The autonomous driving vehicle has sufficient resources. The autonomous driving vehicle is moving under the conditions such as at a lower vehicle speed, with smaller acceleration, or at a smaller steering angle. The environment outside the autonomous driving vehicle is as follows. There are obstacles far from the autonomous driving vehicle. There are a small number of obstacles. There is no moving body as an obstacle. The autonomous driving vehicle is in light traffic. It is blight outside. The weather is fine. It is the daytime. There is a response to a request after a long time.

In this manner, depending on conditions, the performance in the autonomous driving may not be improved even by executing the second preprocessing. For example, depending on the following conditions, the performance in the autonomous movement may not be improved by executing the second preprocessing and controlling the travel of the autonomous moving body using the third processing result. The conditions include the resource of the autonomous moving body, the moving condition of the autonomous moving body, the environment outside the autonomous moving body, the time, and the response time to a request. In such cases, the autonomous moving body outputs no request. In other words, depending on conditions, the performance in the autonomous movement may be improved by executing the second preprocessing. In this manner, if the performance in the autonomous movement can be improved, the autonomous moving body outputs a request.

Remote processing requester 210 instructs sensing data receiver 201a to receive the sensing data, and sensing data transmitter 202a to transmit the sensing data to remote autonomous driving server 100a selected by remote processing manager 31.

Sensing data receiver 201a receives the sensing data from the sensors included in the autonomous driving vehicle in accordance with a request from remote processing requester 210. In other respects, sensing data receiver 201a is the same as sensing data receiver 201. The description thereof will thus be omitted.

Sensing data transmitter 202a transmits the sensing data received by sensing data receiver 201a to selected remote autonomous driving server 100a. In other respects, sensing data transmitter 202a is the same as sensing data transmitter 202. The description thereof will thus be omitted.

Remote autonomous driving server 100a further includes request receiver 104 and second preprocessing execution determiner 105, and include sensing data receiver 101a and remote autonomous driving system 102a in place of sensing data receiver 101 and remote autonomous driving system 102. In these respects, remote autonomous driving server 100a differs from remote autonomous driving server 100 according to Embodiment 2. In other respects, remote autonomous driving server 100a has the same configuration as remote autonomous driving server 100. The description thereof will thus be omitted. Like the other constituent elements, each of request receiver 104 and second preprocessing execution determiner 105 may be a processor, for example, that executes the programs stored in the memory.

Request receiver 104 is basically the same as request receiver 16 according to the variation of Embodiment 1. The description thereof will thus be omitted.

Second preprocessing execution determiner 105 is basically the same as second preprocessing execution determiner 17 according to the variation of Embodiment 1. The description thereof will thus be omitted.

When the second preprocessing is determined to be executed upon receipt of a request from the autonomous driving vehicle, sensing data receiver 101a receives the sensing data. In other respects, sensing data receiver 101a is the same as sensing data receiver 101. The description thereof will thus be omitted.

When the second preprocessing is determined to be executed upon receipt of a request from the autonomous driving vehicle, remote autonomous driving system 102a executes the second preprocessing based on the sensing data received by sensing data receiver 101a to receive a second processing result. In other respects, remote autonomous driving system 102a is the same as remote autonomous driving system 102. The description thereof will thus be omitted.

Next, an operation of the autonomous driving vehicle will be described with reference to FIG. 9.

Figure 9:
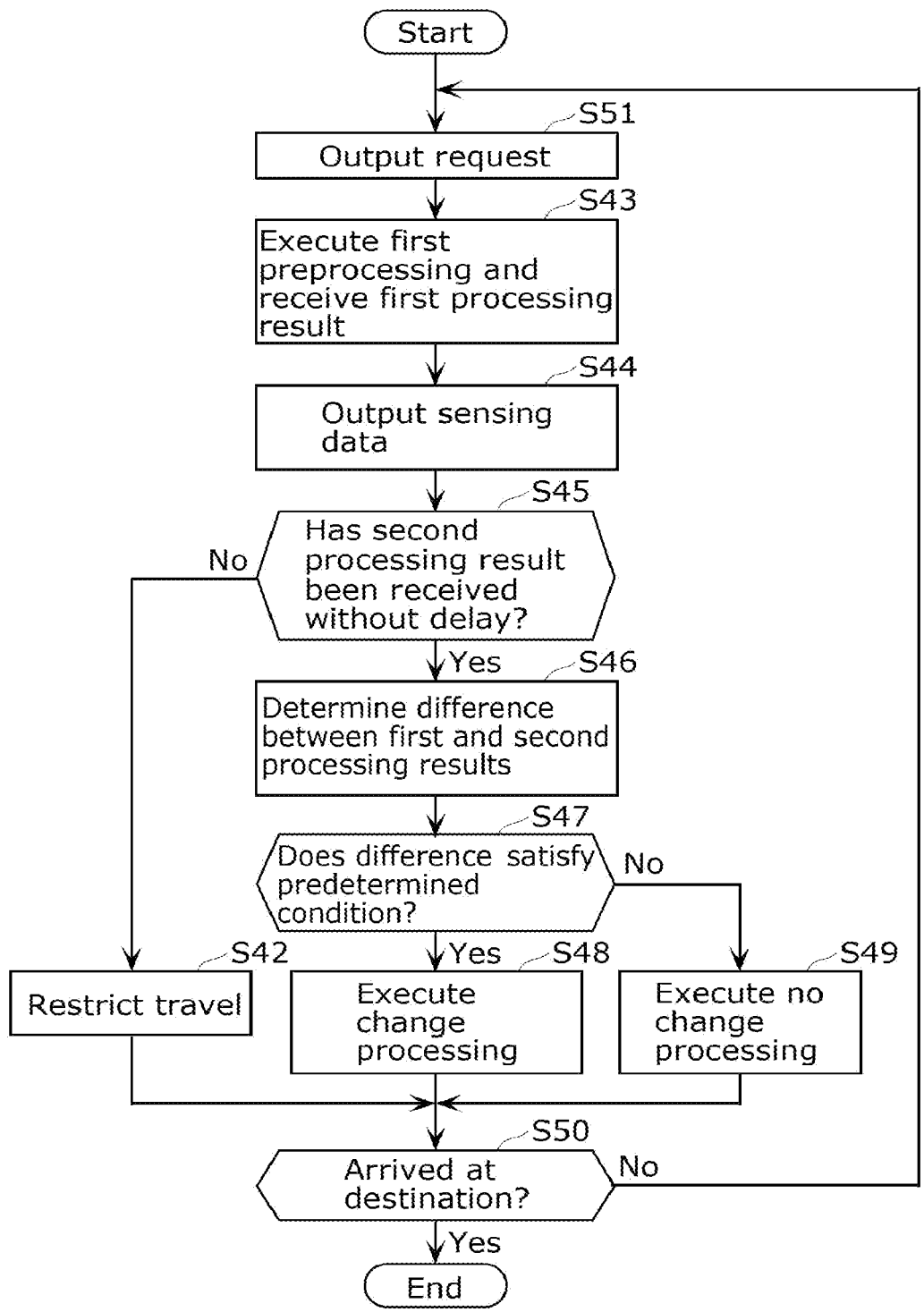
FIG. 9 is a flowchart showing an example operation of the autonomous driving vehicle according to the variation of Embodiment 2.

Unlike the flowchart shown in FIG. 7, the flowchart shown in FIG. 9 further includes additional step S51 in place of step S41. The other respects (i.e., steps S42 to S50) are the same as those shown in FIG. 7. The description thereof will thus be omitted.

The autonomous driving vehicle outputs a request to execute the second preprocessing to remote autonomous driving server 100a (step S51). For example, after outputting the request, the autonomous driving vehicle receives a notification from remote processing management server 30. The notification indicates to which remote autonomous driving server 100a the sensing data is to be output as the server capable of executing the second preprocessing. The autonomous driving vehicle receives the second processing result as a response to the request in step S45. If there is no response to the request after outputting the request, the autonomous driving vehicle may determine that there is no communicative connection with remote processing management server 30, for example, and restrict the travel of the autonomous driving vehicle.

Note that a request for the execution of the second preprocessing may include information designating specific processing out of the second preprocessing. This is because, depending on the moving conditions, the external environment, or other conditions of the autonomous driving vehicle, the difference may be determined only in the specific processing (e.g., only the obstacle detection processing or only the travel determination processing). This allows the autonomous driving vehicle to designate the specific processing out of the second preprocessing, for example, as desired by the autonomous driving vehicle, and remote autonomous driving server 100a to selectively execute the specific processing. In this case, the autonomous driving vehicle receives a second processing result that is a result of executing the specific processing in steps S45 and S46, and determines the difference only in the specific processing.

Even if the autonomous driving vehicle receives the second processing result after a lapse of a predetermined time or more after the sensing data or the request has been output (i.e., No in step S45), the processing may proceed to step S46 to determine the difference between a part of the first processing result and the corresponding part of the second processing result. For example, the part of each processing result is less susceptible by a delay. For example, the part of each processing result is a result of surrounding recognition processing which is less susceptible by a delay. For example, since a result of the processing of estimating the position of the autonomous driving vehicle itself is more susceptible by a delay, there is no need to execute the determination on the difference in the processing result. In accordance with the determined difference, the autonomous driving vehicle may change the part of the first processing result to the third processing result. In this manner, if a second processing result is received after a lapse of a predetermined time or more after the sensing data or the request has been output, there may be a delay in the communications with remote autonomous driving server 100a. At this time, the processing load of autonomous driving vehicle (specifically, information processing device 200a) is reduced by executing no difference determination or the determination only on the difference in a part of the processing result that is not susceptible by the delay.

As described above, the remote autonomous driving server may start executing the second preprocessing, for example, upon output of a request from the autonomous driving vehicle. This allows the execution of the second preprocessing when the autonomous driving vehicle requests the execution of the advanced second preprocessing.

Variation Common Between Embodiments

In the embodiments described above, a change in the preprocessing results is instructed or controlled depending on whether there is a delay in the second preprocessing. If there is a delay, a change may be instructed or controlled depending on whether processing of correcting the delay is possible.

A change in the preprocessing results may be instructed or controlled or the travel restriction may be instructed or performed in accordance with an operational design domain (ODD) according to the delay and the difference in addition to the difference between the first and second processing results. The ODD is set using the time, the area, the travel conditions (e.g., speed, acceleration, or steering angle), the environment (e.g., the weather or the brightness), for example, as factors.

Figure 10:
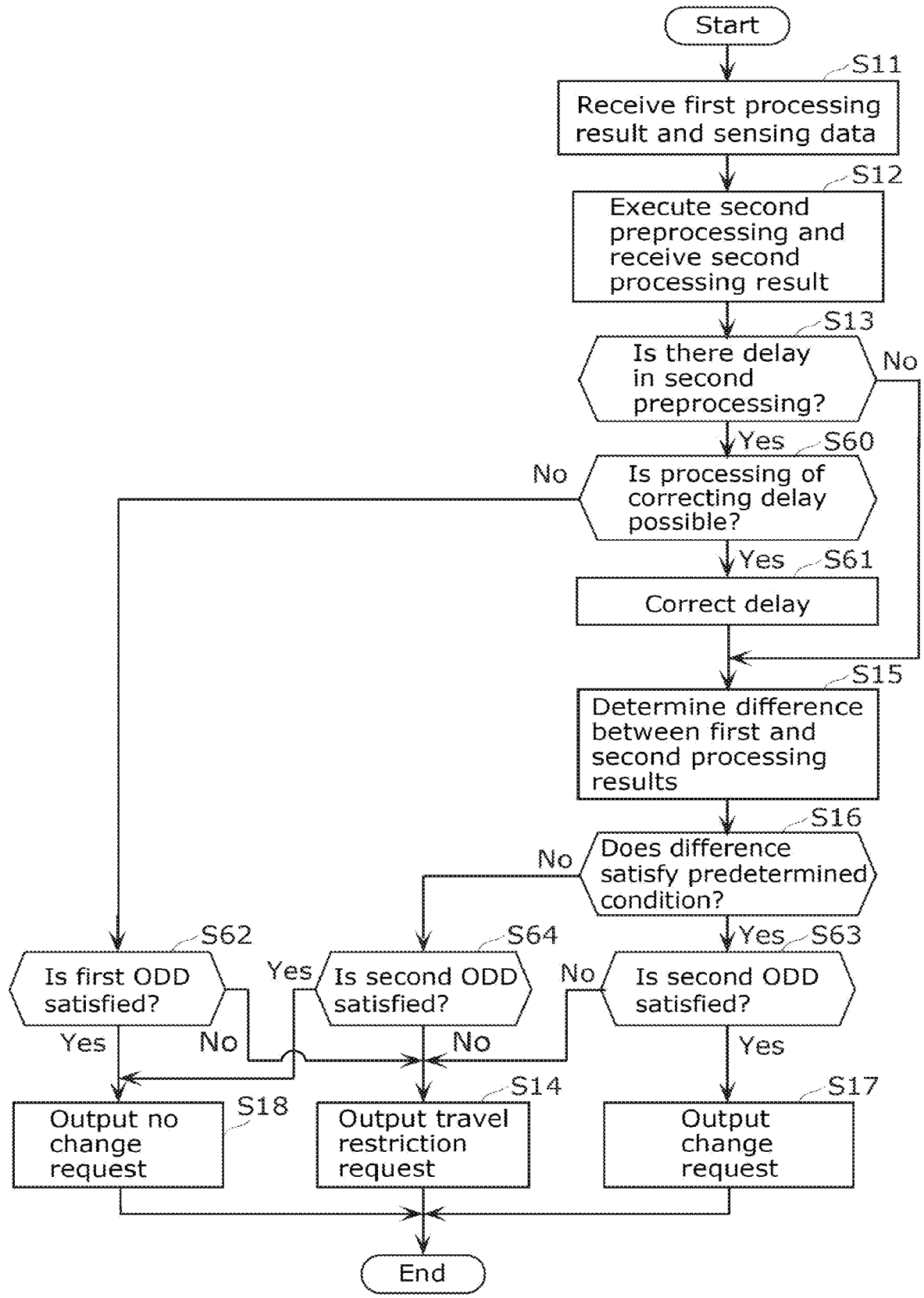
FIG. 10 is a flowchart showing an example of an information processing method according to a variation common between the embodiments.

The processing described above will be described with reference to FIG. 10. FIG. 10 is a flowchart showing an example of an information processing method according to a variation common between the embodiments. Note that the description of substantially the same processing as in the embodiments described above will be omitted.

If there is a delay in the second preprocessing (Yes in step S13), the server (e.g., the remote autonomous driving server) determines whether the processing of correcting the delay is possible (step S60). Specifically, if there is a communication delay between the server and the autonomous driving vehicle or there is a delay as described above, the server determines whether the time lag in the processing result due to the delay can be corrected (e.g., reduced or diminished). For example, whether the amount of delay is smaller than or equal to a threshold is determined.

If the processing of correcting the delay is possible (Yes in step S60), the server executes the correction processing (step S61). Specifically, if the amount of delay is smaller than or equal to a threshold, the server executes the processing of correcting the second preprocessing result.

If there is no delay in the second preprocessing (No in step S13) or after the execution of the correction processing, the processing proceeds to step S15 and S16.

If the processing of correcting the delay is impossible (No in step S60), the server determines whether a first ODD is satisfied (step S62). Specifically, the first ODD is set for the autonomous driving of the autonomous driving vehicle. For example, the first ODD is as follows. The autonomous driving vehicle travels in an area other than an intersection, at a speed of 20 km/h or lower when the weather is fine.

If the first ODD is satisfied, the server outputs no change request (step S18). In this case, the travel control processing is performed in the autonomous driving based on a result of the first preprocessing executed by the autonomous driving vehicle.

If the difference between the first and second preprocessing satisfies a predetermined condition (Yes in step S16), the server determines whether a second ODD is satisfied (step S63). Specifically, the second ODD is set for the autonomous driving of the autonomous driving vehicle but different from the first ODD. For example, the second ODD is as follows. The autonomous driving vehicle travels in any area, at a speed of 15 km/h or lower when it is fine or raining. In this manner, the second ODD is at least partially laxer than the first ODD. On the other hand, if the second processing result is used, the communication is used. The items of the second ODD susceptible by a delay are equal or stricter than the first ODD.

If the difference satisfies the predetermined condition and the second ODD is satisfied (Yes in step S63), the server outputs a change request (step S17). In this case, the travel control processing is performed in the autonomous driving using a result of the second preprocessing executed by the server or a corrected result of the first preprocessing.

If the difference between the first and second preprocessing does not satisfy the predetermined condition (No in step S16), the server determines whether the second ODD is satisfied (step S64). This processing is substantially the same as the processing in step S63.

If the difference does not satisfy the predetermined condition but the second ODD is satisfied (Yes in step S64), the server outputs no change request (step S18). In this manner, when the difference does not satisfy the predetermined condition, the second ODD is used for the following reasons. The difference between the result of the preprocessing by the server and the result of the preprocessing by the autonomous driving vehicle does not satisfy the predetermined condition. In other words, the result of the preprocessing by the autonomous driving vehicle can be handled equally as the result of the preprocessing by the server.

If the first ODD is not satisfied (No in step S62) or the second ODD is not satisfied (No in step S63 or S64), the server outputs a travel restriction request (step S14).

An example has been described with reference to FIG. 10 where the server determines whether the processing of correcting the delay is possible, and determines to instruct a change in the preprocessing results or travel restriction in accordance with the ODD corresponding to the delay and difference. Instead, the autonomous driving vehicle may determine whether the processing of correcting the delay is possible, and execute the control of a change in the preprocessing results or travel restriction in accordance with the ODD corresponding to the delay and difference.

A change in the preprocessing results may be instructed or controlled depending on whether there is a communication disturbance in the second preprocessing. Specifically, a communication disturbance corresponds to a communication data loss. For example, a change in the preprocessing results may be instructed or controlled depending on whether the rate of the packet loss is higher than or equal to a threshold. Note that the communication disturbance may include the communication delay described above.

If there is a communication disturbance, a change in the preprocessing results may be instructed or controlled depending on whether processing of correcting the communication disturbance is possible. Specifically, a change in the preprocessing results is instructed or controlled depending on whether the data deficient due to the communication data loss can be complemented. For example, a change in the preprocessing results is instructed or controlled in accordance with the rate of the lost packets that can be complemented.

Other Embodiments

As described above, the information processing method, information processing system (e.g., remote autonomous driving server), and information processing device according to one or more aspects of the present disclosure have been described based on the embodiments. The present disclosure is however not limited to these embodiments. One or more aspects of the present disclosure may include other embodiments, such as those received by variously modifying the embodiments as conceived by those skilled in the art or those achieved by freely combining the constituent elements in the embodiments without departing from the scope and spirit of the present disclosure.

For example, the present disclosure may be implemented as a program for causing a processor to execute the steps included in the information processing method. The present disclosure may further be implemented as a non-transitory computer-readable recording medium, such as a CD-ROM, storing the program.

For example, if the present disclosure is implemented as a program (software), the steps are executed by executing the program utilizing hardware resources, such as a CPU, a memory, and an input/output circuit, of a computer. That is, the CPU receives data from the memory, an input/output circuit, etc. and calculates the data, or outputs a result of the calculation to the memory, the input/output circuit, etc. to execute the steps.

Note that the constituent elements included in the information processing system and information processing device according to the embodiments may be achieved by dedicated hardware or by executing software programs suitable for the constituent elements. The constituent elements may be achieved by a program executor, such as a CPU or a processor, reading and executing the software programs stored in a storage media such as a hard disk or a semiconductor memory.

Some or all of the functions of the information processing system and information processing device according to the embodiments are typically implemented by, as an integrated circuit, an LSI. The functions may be included individually in single chips, or some or all of the functions may be included in a single chip. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed.

The present disclosure includes other embodiments, such as those received by variously modifying the embodiments as conceived by those skilled in the art without departing from the scope and spirit of the present disclosure.

INDUSTRIAL APPLICABILITY

The present disclosure is applicable to a remote-control system for an autonomous driving vehicle.

The invention claimed is:

1. An information processing method to be executed by an information processing device mounted on an autonomous moving body, the information processing method comprising:
   executing first preprocessing based on sensing data received by the autonomous moving body, to receive a first processing result, the first preprocessing being preprocessing of travel control processing in autonomous driving of the autonomous moving body;
   outputting the sensing data to an external device;
   receiving, from the external device, a second processing result received by executing second preprocessing based on the sensing data, the second preprocessing being preprocessing that is more advanced than the first preprocessing and executed by the external device that is connected to the autonomous moving body via a network and has a processing power higher than a processing power of the information processing device;
   restricting travel of the autonomous moving body when there is a communication delay between the autonomous moving body and the external device or there is a processing delay in the second preprocessing; and
   performing travel control of the autonomous moving body based on the first processing result or a third processing result when there is no communication delay between the autonomous moving body and the external device or there is no processing delay in the second preprocessing, wherein
   the third processing result is the second processing result or a processing result received by correcting the first processing result, and
   the information processing method further comprises:
   determining a difference between the first processing result and the second processing result when there is no communication delay between the autonomous moving body and the external device or there is no processing delay in the second preprocessing, and
   changing the first processing result to the third processing result in accordance with the difference determined, and performing the travel control of the autonomous moving body based on the third processing result.

2. The information processing method according to claim 1, wherein
   when a change request to change the first processing result to the third processing result is received and the reception of the change request is delayed due to the communication delay, the change request received is ignored and the travel of the autonomous moving body is restricted.

3. The information processing method according to claim 1, wherein
   when the second processing result could not be received without any delay due to the communication delay, the travel of the autonomous moving body is restricted.

4. The information processing method according to claim 1, wherein
   when (i) the second processing result could not be received without any delay due to the communication delay or there is a processing delay in the second preprocessing, and (ii) the communication delay or the processing delay can be corrected, the travel control of the autonomous moving body is performed based on the first processing result or the third processing result.

5. The information processing method according to claim 1, wherein
when (i) the second processing result could not be received without any delay due to the communication delay or there is a processing delay in the second preprocessing, and (ii) the communication delay or the processing delay cannot be corrected, the travel control of the autonomous moving body is performed based on the first processing result if a predetermined operational design domain (ODD) is satisfied and the travel control of the autonomous moving body is restricted unless the predetermined ODD is satisfied.

6. The information processing method according to claim 1, wherein
when the difference satisfies a predetermined condition, the first processing result is changed to the third processing result and the travel control of the autonomous moving body is performed based on the third processing result.

7. The information processing method according to claim 6, wherein
when the difference satisfies the predetermined condition: the first processing result is changed to the third processing result if a predetermined ODD is satisfied; and the travel of the autonomous moving body is restricted unless the predetermined ODD is satisfied.

8. The information processing method according to claim 1, wherein
when the difference satisfies a predetermined condition, the travel of the autonomous moving body is restricted.

9. The information processing method according to claim 1, wherein
when the difference satisfies a predetermined condition, an anomaly is notified.

10. The information processing method according to claim 1, wherein
when a weather is not suitable for autonomous driving of the autonomous moving body, the difference is not determined, the first processing result is changed to the third processing result, and the travel control of the autonomous moving body is performed based on the third processing result.

11. The information processing method according to claim 1, wherein
when the second processing result is received after a lapse of a predetermined time or more after the sensing data has been output, a difference between a part of the first processing result and a part of the second processing result is determined.

12. The information processing method according to claim 1, further comprising:
outputting a request to execute the second preprocessing to the external device, based on at least one of a resource of the autonomous moving body, a moving condition of the autonomous moving body, an environment outside the autonomous moving body, a time, or a response time to an inquiry to the external device.

13. An information processing device mounted on an autonomous moving body, the information processing device that:
executes first preprocessing based on sensing data received by the autonomous moving body, to receive a first processing result, the first preprocessing being preprocessing of travel control processing in autonomous driving of the autonomous moving body;
outputs the sensing data to an external device;
receives, from the external device, a second processing result received by executing second preprocessing based on the sensing data, the second preprocessing being preprocessing that is more advanced than the first preprocessing and executed by the external device that is connected to the autonomous moving body via a network and has a processing power higher than a processing power of the information processing device;
restricts travel of the autonomous moving body when there is a communication delay between the autonomous moving body and the external device or there is a processing delay in the second preprocessing; and
performs travel control of the autonomous moving body based on the first processing result or a third processing result when there is no communication delay between the autonomous moving body and the external device or there is no processing delay in the second preprocessing, wherein
the third processing result is the second processing result or a processing result received by correcting the first processing result, and
the information processing device further:
determines a difference between the first processing result and the second processing result when there is no communication delay between the autonomous moving body and the external device or there is no processing delay in the second preprocessing, and
changes the first processing result to the third processing result in accordance with the difference determined, and performing the travel control of the autonomous moving body based on the third processing result.

14. An information processing method to be executed by an external device connected to an autonomous moving body via a network, the information processing method comprising:
receiving, from the autonomous moving body, a first processing result that is a result of first preprocessing and sensing data received by the autonomous moving body, the first preprocessing being preprocessing of travel control processing in autonomous movement processing of the autonomous moving body and executed based on the sensing data by an information processing device included in the autonomous moving body;
executing second preprocessing based on the sensing data to receive a second processing result, the second preprocessing being more advanced than the first preprocessing, the external device having a processing power higher than a processing power of the information processing device;
outputting, to the autonomous moving body, a travel restriction request to restrict travel of the autonomous moving body when there is a communication delay between the autonomous moving body and the external device or there is a processing delay in the second preprocessing;
outputting, to the autonomous moving body, a change request to change the first processing result to a third processing result when there is no communication delay between the autonomous moving body and the external device or there is no processing delay in the second preprocessing, wherein the third processing result is the second processing result or a processing result received by correcting the first processing result, and the information processing method further comprises:
- determining a difference between the first processing result and the second processing result when there is no communication delay between the autonomous moving body and the external device or there is no processing delay in the second preprocessing; and
- outputting the change request to the autonomous moving body in accordance with the difference determined.

15. The information processing method according to claim 14, wherein
when (i) there is a communication delay between the autonomous moving body and the external device or there is a processing delay in the second preprocessing and (ii) the communication delay or the processing delay cannot be corrected: the change request is not output to the autonomous moving body if a predetermined operational design domain (ODD) is satisfied; and the travel restriction request is output to the autonomous moving body unless the predetermined ODD is satisfied.

16. The information processing method according to claim 14, wherein
the change request is output to the autonomous moving body when the difference satisfies a predetermined condition.

17. The information processing method according to claim 16, wherein
when the difference satisfies the predetermined condition, (i) the change request is output to the autonomous moving body if a predetermined ODD is satisfied, and (ii) the travel restriction request is output to the autonomous moving body unless the predetermined ODD is satisfied.

18. The information processing method according to claim 14, wherein
when a request to execute the second preprocessing is received from a plurality of autonomous moving bodies each of which is the autonomous moving body, an autonomous moving body whose request is preferentially selected from among the plurality of autonomous moving bodies based on at least one of resources of the plurality of autonomous moving bodies, moving conditions of the plurality of autonomous moving bodies, environments outside the plurality of autonomous moving bodies, times, or response times to the requests.

* * * * *